(12) United States Patent
Padurariu et al.

(10) Patent No.: US 12,301,974 B2
(45) Date of Patent: May 13, 2025

(54) VISION MODULE FOR MONITORING A DRIVER OF A VEHICLE AND METHOD FOR MANUFACTURING A VISION MODULE FOR MONITORING A DRIVER OF A VEHICLE

(71) Applicant: Veoneer Sweden AB, Vargarda (SE)

(72) Inventors: Catalin Padurariu, Iasi (RO); Adrian Homutescu, Iasi (RO)

(73) Assignee: MAGNA ELECTRONICS SWEDEN AB, Vårgårda (SE)

( * ) Notice: Subject to any disclaimer, the term of this patent is extended or adjusted under 35 U.S.C. 154(b) by 95 days.

(21) Appl. No.: 18/248,969

(22) PCT Filed: Oct. 12, 2021

(86) PCT No.: PCT/EP2021/078141
§ 371 (c)(1),
(2) Date: Apr. 13, 2023

(87) PCT Pub. No.: WO2022/084101
PCT Pub. Date: Apr. 28, 2022

(65) Prior Publication Data
US 2023/0396862 A1    Dec. 7, 2023

(30) Foreign Application Priority Data

Oct. 19, 2020    (EP) .................................... 20202497

(51) Int. Cl.
*H04N 23/57*    (2023.01)
*B60R 1/00*    (2022.01)
(Continued)

(52) U.S. Cl.
CPC ............. *H04N 23/57* (2023.01); *B60R 11/04* (2013.01); *H04N 23/51* (2023.01); *H04N 23/54* (2023.01);
(Continued)

(58) Field of Classification Search
CPC ........ H04N 23/50; H04N 23/51; H04N 23/54; H04N 23/55; H04N 23/57; H04N 23/695;
(Continued)

(56) References Cited

U.S. PATENT DOCUMENTS 11,292,610 B2    4/2022    Brüchmann
2004/0203535 A1    10/2004    Kim et al.
(Continued)

FOREIGN PATENT DOCUMENTS

CN    203327131 U    * 12/2013    ............. B60R 11/04
CN    210016543 U    2/2020
(Continued)

OTHER PUBLICATIONS

International Search Report and Written Opinion of PCT/EP2021/078141, mailed Feb. 24, 2022.
(Continued)

*Primary Examiner* — Twyler L Haskins
*Assistant Examiner* — Akshay Trehan
(74) *Attorney, Agent, or Firm* — DICKINSON WRIGHT PLLC

(57) ABSTRACT

A vision module (1) for monitoring a driver (5) of a vehicle (2) and a method for manufacturing a vision module (1) for monitoring a driver (5) of a vehicle (2). The vision module (1) has at least a camera sub-assembly (10) positioned inside an outer housing (7). The outer housing (7) is defined by a housing cover (8) and a housing base (9). A housing part (20) for the camera sub-assembly (10) has a spherical outer topology (21). A mounting structure (30) is in cooperation with the spherical outer topology (21) of the camera sub-assembly (10) for setting a spatial angular orientation of the camera sub-assembly (10). A receptacle (16) of the housing base (9) receives the mounting structure (30). The housing cover (8) is mounted to the housing base (9) and holds the
(Continued)

mounting structure (30) in a defined position in the outer housing (7).

12 Claims, 17 Drawing Sheets

(51) Int. Cl.
    *B60R 1/04*         (2006.01)
    *B60R 1/12*         (2006.01)
    *B60R 11/04*       (2006.01)
    *H04N 23/51*       (2023.01)
    *H04N 23/54*       (2023.01)
    *H04N 23/55*       (2023.01)
    *H04N 23/695*     (2023.01)

(52) U.S. Cl.
    CPC ........... *H04N 23/55* (2023.01); *H04N 23/695* (2023.01); *B60R 1/00* (2013.01); *B60R 1/04* (2013.01); *B60R 2001/1253* (2013.01); *B60R 2300/00* (2013.01)

(58) Field of Classification Search
    CPC .. G03B 17/02; B60R 1/00; B60R 1/04; B60R 2001/1253; B60R 11/04; B60R 2300/00
    See application file for complete search history.

(56) References Cited

U.S. PATENT DOCUMENTS

| | | |
|---|---|---|
| 2018/0222402 A1 | 8/2018 | Bingle et al. |
| 2019/0208091 A1 | 7/2019 | Mleczko et al. |
| 2019/0268512 A1* | 8/2019 | Matsuo ................... H04N 23/51 |
| 2020/0307825 A1* | 10/2020 | Brüchmann ........... H04N 23/51 |

FOREIGN PATENT DOCUMENTS

| | | |
|---|---|---|
| EP | 1469656 A2 | 10/2004 |
| EP | 3531685 A1 | 8/2019 |
| WO | 2008091034 A1 | 7/2008 |
| WO | 2018219951 A1 | 12/2018 |
| WO | 2019164724 A1 | 8/2019 |

OTHER PUBLICATIONS

European Patent Application No. 20 202 497.2, Article 94(3) EPC Examination Report mailed Jun. 7, 2024; pp. 1-5.

* cited by examiner

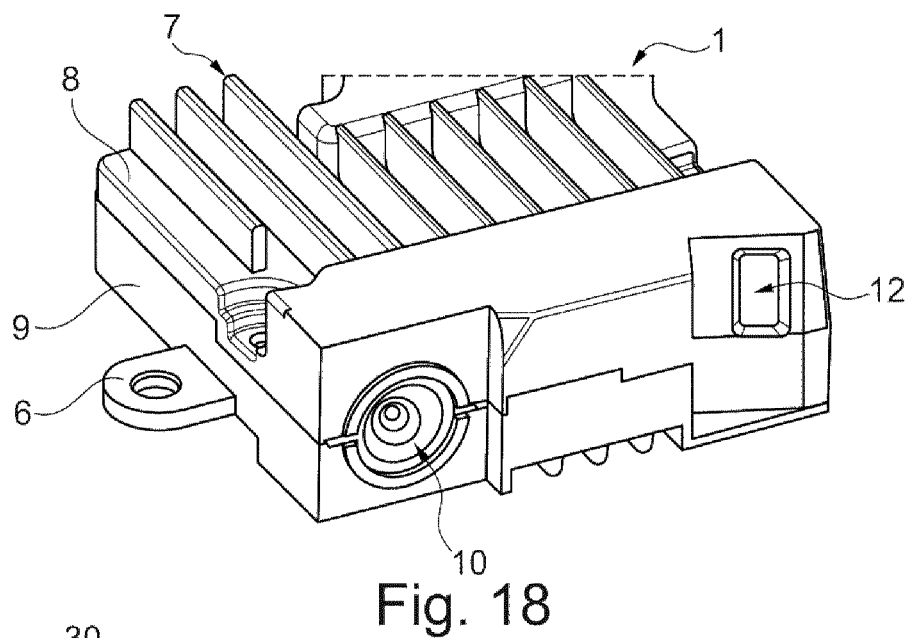
Fig. 18
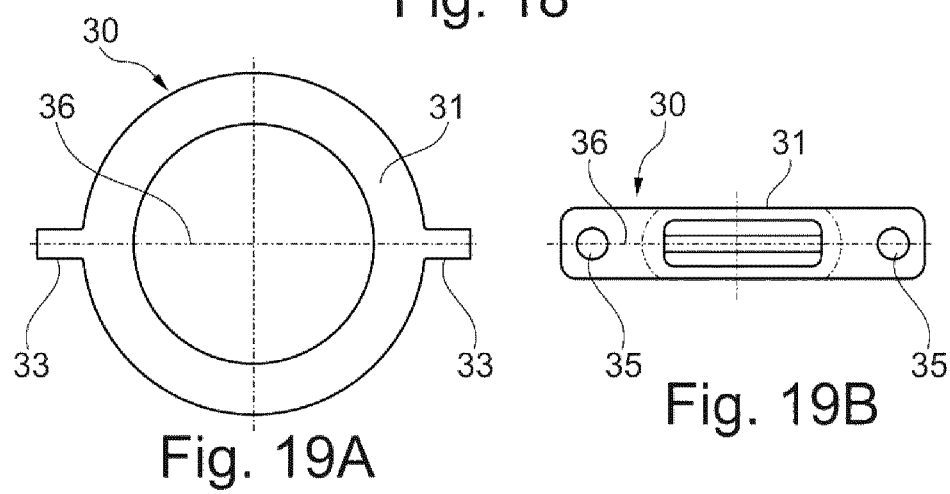
Fig. 19A
Fig. 19B
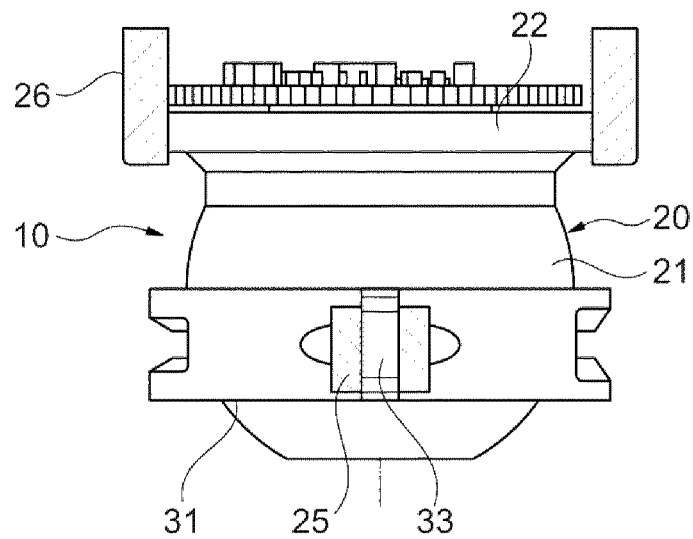
Fig. 20A

VISION MODULE FOR MONITORING A DRIVER OF A VEHICLE AND METHOD FOR MANUFACTURING A VISION MODULE FOR MONITORING A DRIVER OF A VEHICLE

CROSS-REFERENCE TO RELATED APPLICATIONS

This application is a 35 U.S.C. § 371 national phase of PCT International Application No. PCT/EP2021/078141, filed Oct. 12, 2021, which claims the benefit of priority under 35 U.S.C. § 119 to EP 20202497.2, filed Oct. 19, 2020, the contents of which are incorporated herein by reference in its entirety.

FIELD OF THE INVENTION

The invention relates to a vision module for monitoring a driver of a vehicle. Especially, the vision module comprises at least a camera sub-assembly which is positioned inside an outer housing. The optical axis of the camera sub-assembly is pointing to an outside of the outer housing. The outer housing is defined by a housing cover and a housing base. A housing part of the camera sub-assembly has a spherical outer topology.

Furthermore, the invention relates to a method for manufacturing a vision module for monitoring a driver of a vehicle. The vision module comprises at least a camera sub-assembly positioned inside an outer housing, so that its optical axis is pointing to an outside of the outer housing. The outer housing is defined by a housing cover and a housing base.

DESCRIPTION OF THE BACKGROUND ART

International Publication No. WO 2019/164724 A1 discloses a camera module assembly. An outer housing for the camera module comprises a front shell with a window and a rear shell. The camera core includes a lens assembly, a sensor assembly, and a sensor housing. The sensor assembly is disposed within the sensor housing, and the sensor housing is fixed to the lens assembly.

International Publication No. WO 2018/219951 A1 relates to a camera module for a motor vehicle. The camera module is used for driver monitoring in the passenger compartment. The camera module has at least one printed circuit board and a shield for enclosing said printed circuit board. The shield comprises at least a first shielding part and a second shielding part.

U.S. Publication No. US 2019/208091 A1 discloses a camera module for a vehicular vision system. The camera module includes a metal front housing, a lens holder and a metal rear housing. The front housing houses a printed circuit board having an imager disposed thereat. The lens holder is attached at a front portion of the housing so that a lens assembly is optically aligned with the imager.

U.S. Publication No. US 2018/222402 A1 discloses a camera housing portion which has an imaging sensor at a base portion of the camera housing portion. A lens system is positioned at a first portion of the camera housing portion. A first circuit board is provided which includes a circuitry associated with the imaging sensor, which is disposed at a second circuit board which is in board-to-board electrical connection with the first circuit board. The camera housing portion and a connector portion are joined together to encase the first and second circuit boards.

Chinese utility model CN 203327131 U discloses a camera to be mounted in a vehicle. The street lamp like camera comprises a base and a cover. The spherical camera body fits in a through hole of the base. A clamp bracket is screwed to the base to hold the camera body in position. The cover has no influence on the positioning of the camera body.

Chinese utility model CN 210016543 U discloses a camera device, which has a housing comprising an upper casing and a lower casing which matches with the upper casing. The upper casing has a mounting hole for the camera component. The lower casing just provides, together with the upper casing, the closed housing and has no influence on the positioning of the camera body.

European Publication No. EP 3 531 685 A1 discloses an image capturing apparatus which includes a camera unit, a substrate unit arranged near the camera unit, a substantially sphere-shaped dome cover configured to cover the camera unit. A housing is configured to support the dome cover and to cover the substrate unit. The dome cover has no influence on the orientation of the camera unit.

In general, vision modules with at least a vision camera are more and more present in vehicles. They are used for scanning the environment of the vehicle and also the driver and passengers, sending the data to an ECU (electronic control unit) which processes the data and sends out warnings to the driver or acts on the vehicle brakes. The most advanced vision cameras use two cameras working in stereo configuration to output the distance to an object. An algorithm is used and the ECU calculates the distance to the object.

In existing prior art systems or vision modules, the vision camera, which is part of the module, is calibrated during installation with regards to the relative positioning image sensor. The vision camera is fixed by a fixing glue, which fixes the camera housing to the printed circuit board after curing. The vision camera and the printed circuit board are temporarily fixed together by an external fixture until glue is cured. Afterwards, the sub-assembly of the camera and the printed circuit board are fixed to the housing.

The vision modules may comprise an infrared module for illumination. With different car lines, the required position of an infrared module in the vehicle may differ from car line to car line in order to keep focus on the driver or provide the desired illumination. In order to function properly, the installation position of the infrared module, included in the vision module, is made at different angles as well as inside the electronic control unit (ECU) of the driver monitoring system. This is due to the necessity of mounting of the vision module's ECU in different positions in the vehicle, also if it is mounted on vehicles with steering on the left or right side, but not limited to it. This brings about a diversity of housing and cover parts, so that similar projects do not share the same housings and covers. It may be that ECUs with identical functions and printed circuit boards are different in construction due to that. Consequently, the development, validation and manufacturing costs are therefore high for such a vision module.

SUMMARY OF THE INVENTION

It is an object of the present invention to provide a vision module for monitoring a driver of a vehicle which can be used for a wide variety of car lines, and the vision module should save costs and reduce the variety of parts for vision modules.

The above object is achieved by a vision module for monitoring a driver as described herein.

It is a further object of the present invention to provide a method for manufacturing a vision module for monitoring a driver of a vehicle which allows a safe and secure orientation of an optical axis of a vision camera of the vision module and can be used for a wide variety of car lines and the inventive method should save costs and reduce the variety of parts of the vision module.

The above object is achieved by a method for manufacturing a vision module for monitoring a driver as described herein.

According to embodiments of the invention, a vision module for monitoring a driver of a vehicle has at least a camera sub-assembly which is positioned inside an outer housing. The optical axis of the camera sub-assembly is pointing to an outside of the outer housing. The outer housing is defined by a housing cover and a housing base. A housing part for the camera sub-assembly has a spherical outer topology. A mounting structure is in cooperation with the spherical outer topology of the camera sub-assembly for allowing the setting of a spatial angular orientation of the camera sub-assembly. A receptacle of the housing base is provided for receiving a mounting structure. The housing cover, mounted to the housing base, holds the mounting structure in a defined position in the outer housing.

The advantage of the vision module is that it can be used with different car lines. Furthermore, the vision module can reflect as well the various needs of the drivers. With the present invention, the diversity of housing parts and cover parts is reduced, and the development, validation and manufacturing costs are reduced as well, because the inventive embodiment of the vision module can serve multiple carlines.

According to an embodiment of the present invention, the mounting structure is a retainer ring with a spheroidal inner topology. The spheroidal inner topology of the retainer ring matches the spherical outer contour of the housing part of the camera sub-assembly.

The advantage is that the orientation of the optical axis of the camera sub-assembly can be set before the camera sub-assembly is mounted to the housing base or the outer housing is assembled completely (the same outer housing for various car lies or needs). Additionally, the match of the spheroidal inner topology of the retainer ring and the spherical outer contour of the housing part of the camera sub-assembly allow a rotation of the housing part of the camera sub-assembly. Consequently, multiple relative positions of the retainer ring and the camera sub-assembly are possible, which is due to the nature of the spherical joint.

According to a further embodiment of the present invention, the spherical inner topology of the retainer ring is centered in a middle plane of the retainer ring. Consequently, the spherical inner topology of the retainer ring matches the spherical outer contour of the housing part of the camera sub-assembly at a position of a maximal diameter of the housing part of the camera sub-assembly. The maximal diameter is perpendicular to the optical axis.

The advantage of this embodiment is that as well multiple relative positions of the retainer ring and the camera sub-assembly are possible, which is due to the nature of the spherical joint. Furthermore, this embodiment achieves an additional robustness against a failure case that the camera sub-assembly could fall out of the lock with the retainer ring or lose the relative position to it.

According to an embodiment of the invention, the set spatial orientation of the optical axis of the camera sub-assembly is fixed by a glue. The glue is provided such that a relative movement of the retainer ring and the spherical outer contour of the housing part of the camera sub-assembly is blocked. The glue may be applied as a seam at a boundary between the retainer ring and the housing part of the camera sub-assembly and/or in at least one window of the retainer ring.

The advantage of the cured glue is that it locks the position of the housing part of the camera sub-assembly relative to the retainer ring and thereby fixes the orientation of the optical axis for further mounting.

According to an embodiment of the invention, the retainer ring is centered with the spherical inner topology in a middle plane of the retainer ring, and the retainer ring matches the spherical outer contour of the housing part of the camera sub-assembly. After spatial orientation of the optical axis, the retainer ring is in tight fit contact with the housing part of the camera sub-assembly.

The advantage of the embodiment is that the spatial orientation of the optical axis can be maintained without a glue. In order to position the optical axis of the camera sub-assembly in the nominal position, the retainer ring is warmed or heated so that the interference is reduced. After the camera sub-assembly is positioned in the retainer ring, it can be as well oriented to achieve the final angular orientation of the optical axis. Immediately afterwards, the retainer ring is to be cooled down by itself or via a special operation (blowing of cold air over the retainer ring etc.) and the tight fit is achieved. This prevents unintentional rotation of the camera sub-assembly in the field. Ideally, the housing part of the camera sub-assembly and the retainer ring shall be manufactured from the same material, e.g. from metal. The same material is needed so that dilation and contraction of fit maintains clamping.

According to an embodiment of the invention, the mounting structure is defined by an indexing pivot and a spherical topology of the housing cover. The indexing pivot is positioned in the receptacle of the housing base. A spherical topology is part of the housing cover which is in form-fitting contact with the spherical outer topology of the housing part of the camera sub-assembly. The form-fitting contact is such that a rotating movement around a pivot shaft is possible. For initiating the rotation, a special tool can be used. The pivot shaft of the indexing pivot is sitting in the housing base and a movement is along the indexing pivot.

According to a further embodiment of the invention, the indexing pivot has a plurality of indexing teeth, which are in contact with a set of indexing holes in the spherical outer topology of the housing part of the camera sub-assembly. The spherical topology of the housing cover is in form fitting contact with the spherical outer topology of the housing part of the camera sub-assembly. Additionally, the indexing pivot may have indexing fins at a bottom side. The indexing fins interact with grooves of an indexing and sitting recess, which is positioned on the receptacle of the housing base.

The advantage of the inventive embodiment is that with the indexing pivot, an angular adjustment solution can be glue free for a spherical camera for a housing part of the camera sub-assembly. With the invention it is possible to accommodate multiple installation angles of the optical axis of the camera sub-assembly. There is no need of redesigning and revalidating concepts when a new carline is imposing a different position of a driver monitoring system inside the vehicle. The angular adjustment of field of view direction is possible at any moment, with a chosen increment. There is no need of providing a glue or other fixation element in order to fix and/or maintain the orientation of the optical axis of the camera sub-assembly. The costs of development, validation and manufacturing new modules is reduced with the invention across a family of products serving multiple carlines. One single product type can be manufactured, which serves multiple carlines. A customer may simply adjust the field of view direction to the needed angle, without effort or intervention of manufacturer.

A method for manufacturing a vision module for monitoring a driver of a vehicle is provided by embodiments of this invention. The vision module comprises at least a camera sub-assembly positioned in an outer housing, wherein its optical axis is pointing to an outside of the outer housing. The outer housing is defined by a housing cover and a housing base. A housing part of the camera sub-assembly has a spherical outer topology. The method for manufacturing a vision module comprises the steps of:

providing a mounting structure to the spherical outer topology of a housing part of the camera sub-assembly;
positioning the camera sub-assembly with the mounting structure in a receptacle of the housing base; and
mounting the housing cover to the housing base and thereby positioning the housing part of the camera sub-assembly, so that a spatial orientation of an optical axis of the camera sub-assembly is fixed by the assembled housing cover in a previously oriented direction, or a spatial orientation of the optical axis of the camera sub-assembly is adjustable by a rotational movement of the housing part of the camera sub-assembly in the assembled outer housing.

The outer housing may be assembled once the housing base and the housing cover are joined together and thereby fixing at least the camera sub-assembly in the state wherein the optical axis of the camera sub-assembly is fixed in the desired spatial orientation.

According to one embodiment, the mounting structure is a retainer ring which surrounds the spherical outer topology of the housing part of the camera sub-assembly. An orientation of the optical axis of the camera sub-assembly is adjusted by a gripping tool prior to positioning the retainer ring on the receptacle of the housing base. The adjusted orientation of the optical axis of the camera sub-assembly may be maintained by a glue applied as a seam between the retainer ring and the spherical outer topology of the housing part and/or by a glue filled in at least one window of the retainer ring. According to a further embodiment, the adjusted orientation of the optical axis of the camera sub-assembly is maintained by a tight fit contact of the retainer ring with the housing part of the camera sub-assembly after a spatial orientation of the optical axis.

The advantage of the embodiment described above is an angular adjustment concept for an optical axis of the camera sub-assembly, so that one concept of a driver monitoring system can be used in different types of vehicles. The costs of development, validation and manufacturing new modules of a driver monitoring system is reduced with the invention.

According to a further embodiment of the invention, the mounting structure is defined by an indexing pivot sitting in the receptacle of the housing base. An orientation of the optical axis of the camera sub-assembly is adjusted by a gripping tool after the housing cover is mounted to the housing base so that a spherical topology of the housing cover is in form fitting contact with the spherical outer topology of the housing part of the camera sub-assembly. An orientation of the optical axis of the camera sub-assembly may be maintained in a first rotating direction by indexing teeth of the indexing pivot which get into contact with another set of indexing holes in the spherical outer topology of the housing part of the camera sub-assembly. An orientation of the optical axis of the camera sub-assembly may be maintained in a second rotating direction by indexing fins of the indexing pivot, which get into contact with a set of indexing grooves of an indexing and sitting recess on the receptacle of the housing base.

The advantage of the above embodiment is that a re-adjustment of the orientation of the optical axis of the camera sub-assembly can be carried out in two directions at any moment. A scenario may be that an original equipment manufacturer has a stock of vision module or electronic control units with camera, however different car lines are assembled. Same vision modules or electronic control units are taken from logistic and, during mounting on the vehicle assembly line, the angles are adjusted according to the particular angular position requirement of each car line. If desired, the adjustment moment (torque) may be tuned so that change of angle may be done by hand by an operator, or the opposite is possible if desired. If desired, the screws close to the sandwich of the housing part of the camera sub-assembly and the mounting structure can bring additional clamping to the package.

BRIEF DESCRIPTION OF THE DRAWINGS

The numerous advantages of the disclosure may be better understood by those skilled in the art by reference to the accompanying figures in which:

FIG. 18 is a perspective view of the outer housing, which is composed of a housing base and a housing cover.

FIG. 19A-19B show various views of a further embodiment of the retainer ring.

FIG. 20A-20B show the stages of mounting the camera sub-assembly and the retainer ring as shown in the embodiment of FIGS. 19A and 19B.

DETAILED DESCRIPTION

Figure 1:
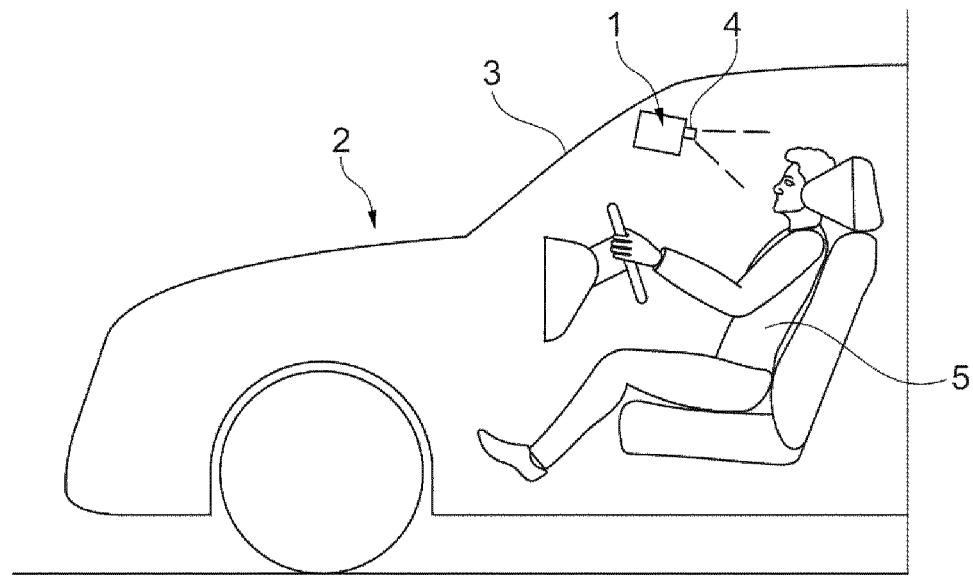
FIG. 1 is a schematic representation of the placement of a vision module with a camera, according to an embodiment of the prior art, in a vehicle.

In the ensuing description, numerous specific details are provided to enable maximum understanding of the embodiments that are provided by way of example. The embodiments may be implemented with or without specific details, or else with other methods, components, materials, etc. In other circumstances, well-known structures, materials, or operations are not illustrated or described in detail so that various aspects of the embodiments will not be obscured. Reference in the course of the present description to "an embodiment" or "one embodiment" means that a particular structure, peculiarity, or characteristic described in connection with its implementation is comprised in at least one embodiment. Hence, phrases such as "in an embodiment" or "in one embodiment" that may recur in various points of the present description do not necessarily refer to one and the same embodiment. Furthermore, the particular structures, peculiarities, or characteristics may be combined in any convenient way in one or more embodiments.

Same reference numerals refer to same elements or elements of similar function throughout the various figures. Furthermore, only reference numerals necessary for the description of the respective figure are shown in the figures. The shown embodiments represent only examples of how the invention can be carried out. This should not be construed as a limitation of the invention.

FIG. 1 shows the arrangement of a vision module 1 inside a motor vehicle 2 according to an embodiment of the prior art. The vision module 1 is mounted at or close to a windshield 3 of the motor vehicle 2, so that at least one vision device 10 (see FIG. 2) of the vision module 1 is looking at a driver 5 of the motor vehicle 2. Especially, a lens 4 of the vision device 10, which is, for example, a vision camera 11, is pointing at the driver 5.

Figure 2:
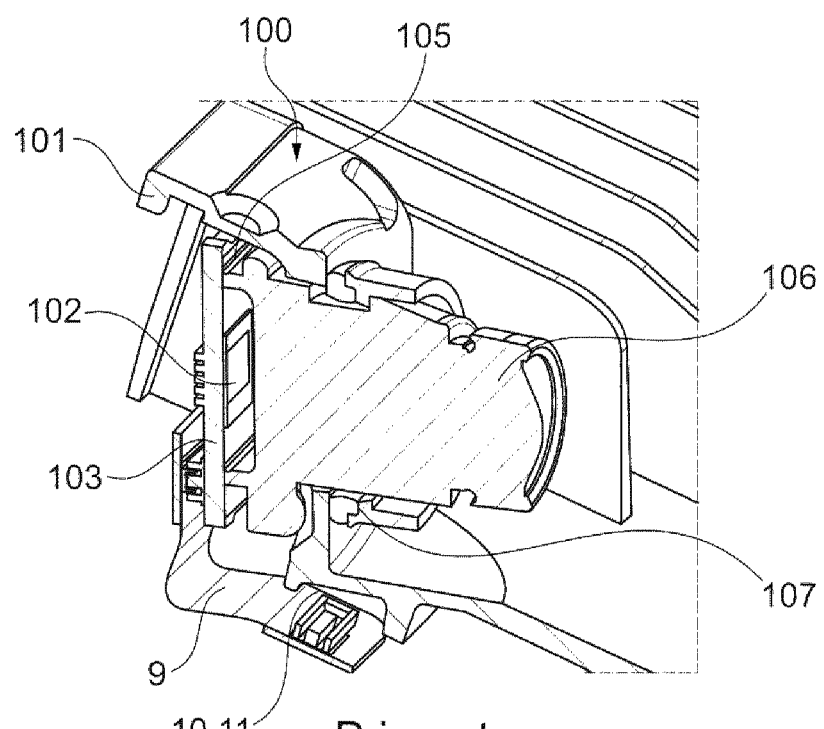
FIG. 2 is a sectional view of an exemplary model of a state of the art vision camera.

FIG. 2 is sectional view of an exemplary model of a state of the art vision camera 100. The vision camera 100 is calibrated during installation with regards to relative positioning an image sensor 102 on a printed circuit board 103. The vision camera 100 is fixed by a fixing glue 105, which fixes camera housing 101 to the printed circuit board 103 after curing. The vision camera 100 and the printed circuit board 103 are temporarily fixed together by external fixture (not shown) until the fixing glue 105 is cured. The assembly of the vision camera 100 and the printed circuit board 103 is afterwards fixed to the camera housing 101. The lens barrel 106 and the printed circuit board 103 are seated by three spheres on the camera on prismatic grooves (not shown) on the camera housing 101. A retainer ring 107 is slipped over the lens barrel 106, wherein a rubber sector (not shown) is compressed between the camera housing 101 and vision camera 100 from the other side. The retainer ring 107 is made from flexible plastic and rubber.

Figure 3:
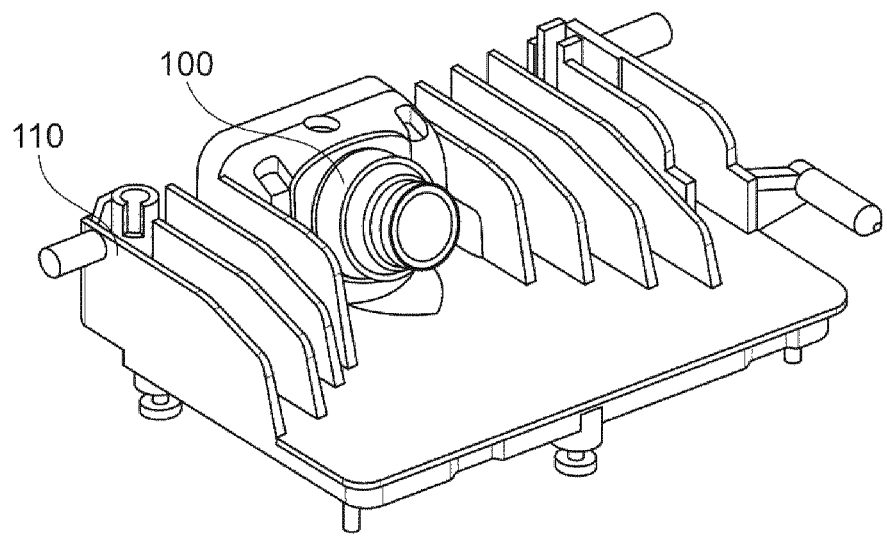
FIG. 3 is a perspective view of a state of the art housing of the vision camera and the printed circuit board.

FIG. 3 is a perspective view of a state of the art housing part 110 of the vision camera 100 and the printed circuit board (not shown here).

Figure 4:
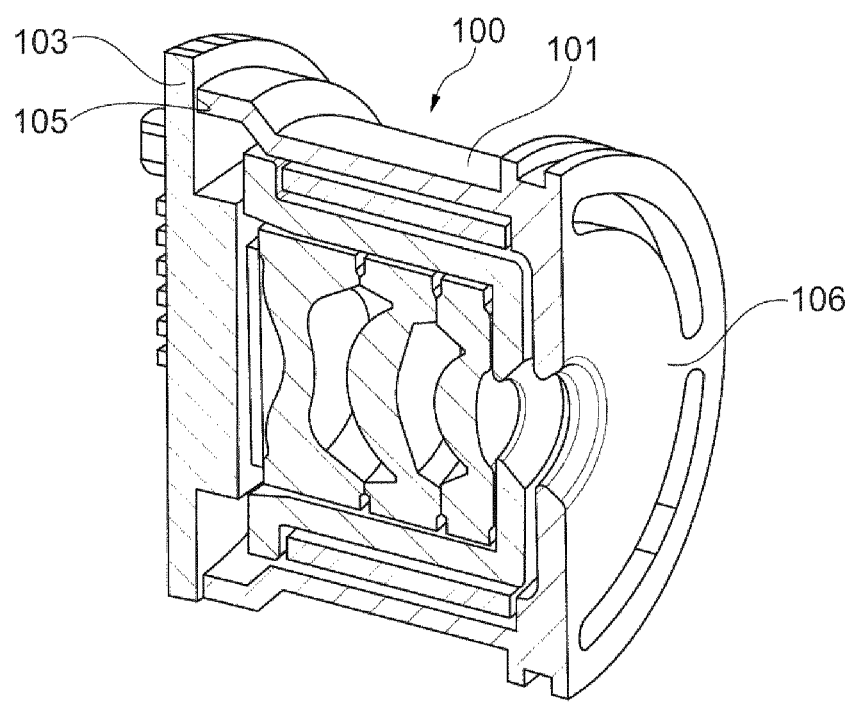
FIG. 4 is a sectional perspective view of an exemplary state of the art module of the vision camera.

FIG. 4 is an exemplary sectional perspective view of a state of the art module of the vision camera 100. The printed circuit board 103 is attached with a fixing glue 105 to the camera housing 101.

Figure 5:
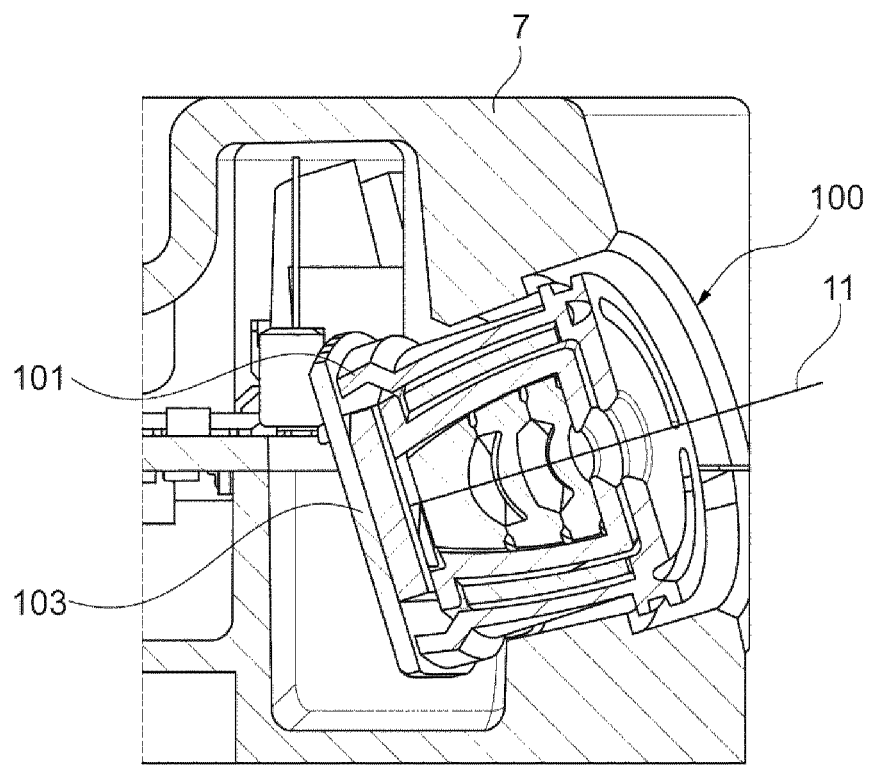
FIG. 5 is a detailed view of a state of the art mounting of a camera of a vision module.

FIG. 5 is a detailed view of a state of the art mounting of a vison camera 100 to an outer housing 7 of a vision module 1. The printed circuit board 103 is attached to the camera housing 101. The vision camera 100 is mounted in the outer housing 101, so that the optical axis 11 of the vision camera 100 is arranged at a spatial angle in relation with the driver 5 of the vehicle 2 (see FIG. 1).

Figure 6:
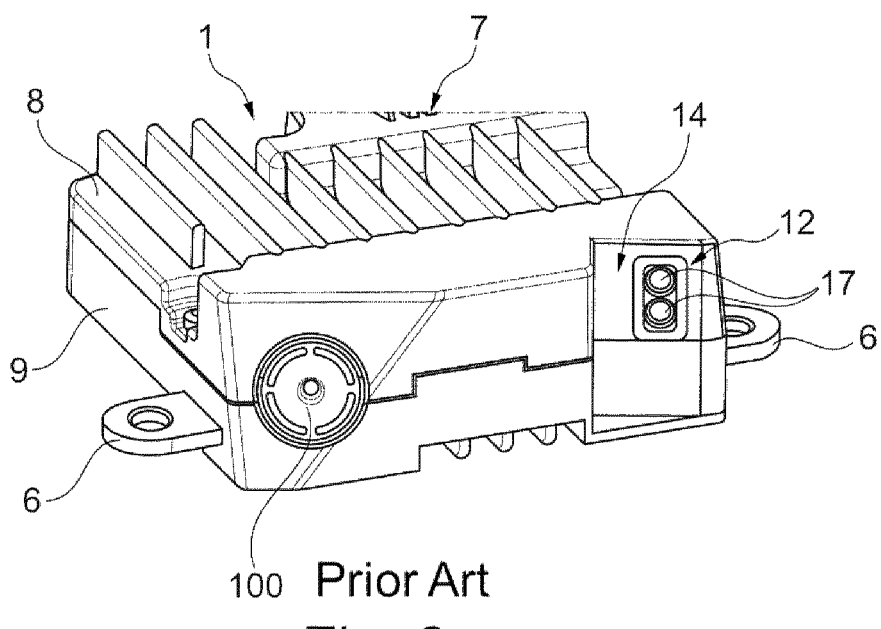
FIG. 6 is a perspective view of a vision module 1 with a vision module and an infrared module in a housing according to the prior art.

FIG. 6 is a perspective view of a vision module 1 according to an embodiment of the prior art. The vision module 1 has a vision camera 100 and an infrared module 12. The vision camera 100 defines a camera window (not shown). The infrared module 12 defines an IR window (not shown). The infrared module 12 of the prior art vision module 1 has two infrared diodes 17. The number of diodes 17 should not be regarded as a limitation. The vision module 1 has an outer housing 7 which is composed of a housing cover 8 and a housing base 9. The housing base 9 has at least one mounting ear 6 for fixing the vision module 1 in the vehicle 2.

The vision module 1 is positioned inside the vehicle 2 in such a manner that the driver's 5 face is predictably in the middle of the vision camera's 100 field of view. The infrared module 12 is positioned in the vicinity of the vision camera 100, so that if natural light is insufficient, the driver 5 is lit in a non-distracting manner by infrared light. The infrared diodes 17 are populated on a printed circuit board 103 which is further attached, for example with thermal paste, to a cooling dome 14. According to the prior art, the cooling dome 14 is made of metal.

Figure 7A:
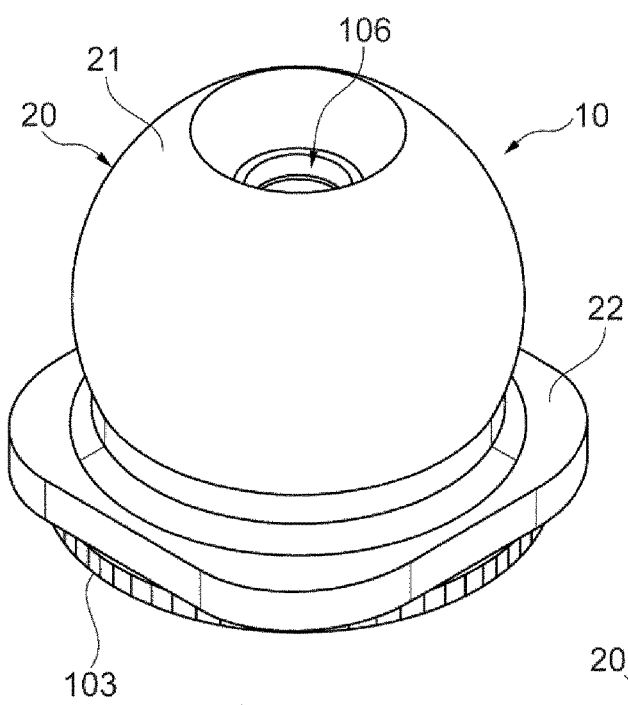
FIGS. 7A to 7C are various views of one embodiment of the camera sub-assembly according to the present invention.
Figure 7B:
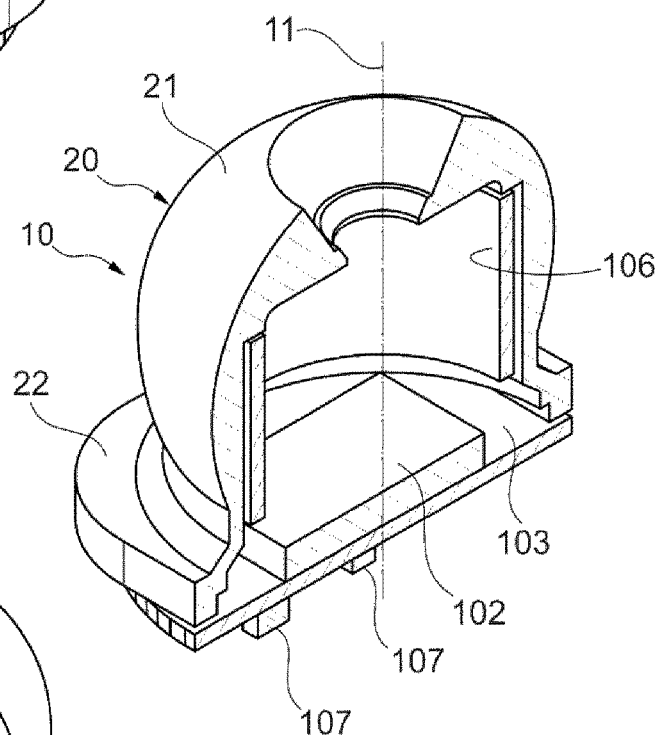
Figure 7C:
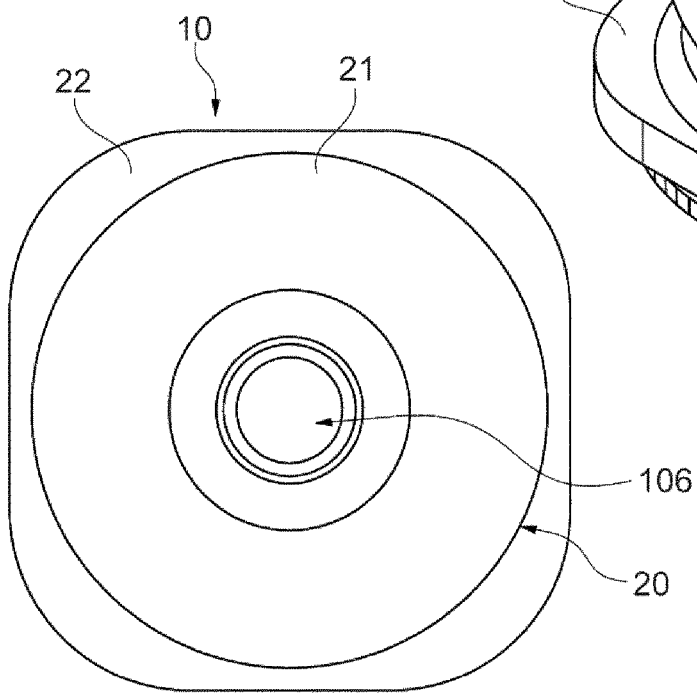

FIGS. 7A to 7C are various views of one embodiment of the camera sub-assembly 10 according to the present invention. The camera sub-assembly 10 comprises a lens barrel 106 which is surrounded by a housing part 20 that has a spherical outer topology 21 (or spheroidal topology). The housing part 20 of the camera sub-assembly 10 has formed a gripping base 22, which is utilized for gripping camera sub-assembly 10 to achieve a desired orientation of an optical axis 11. A tool (not shown) is used to set the desired orientation. A printed circuit board 103 with an image sensor 102 is attached to the gripping base 22. The lens barrel 106 defines the optical axis 11 which is perpendicular on the image sensor 102.

Figure 8A:
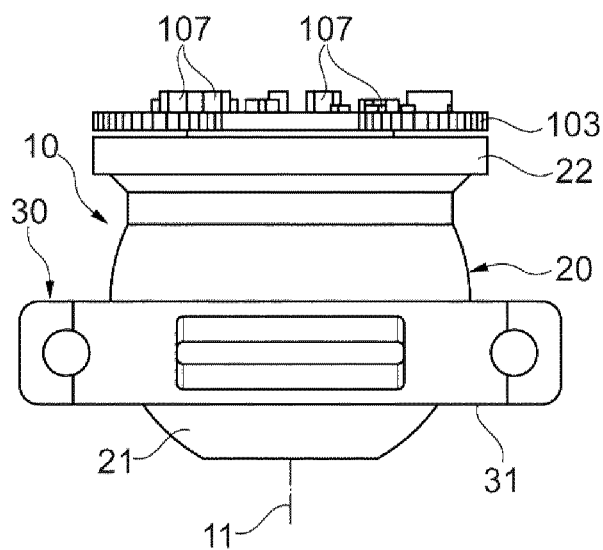
FIGS. 8A to 8C are various views of the camera sub-assembly with a mounting structure for adjusting various orientations of the camera sub-assembly.
Figure 8A:
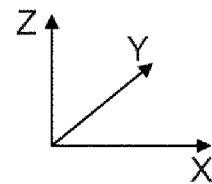
Figure 8B:
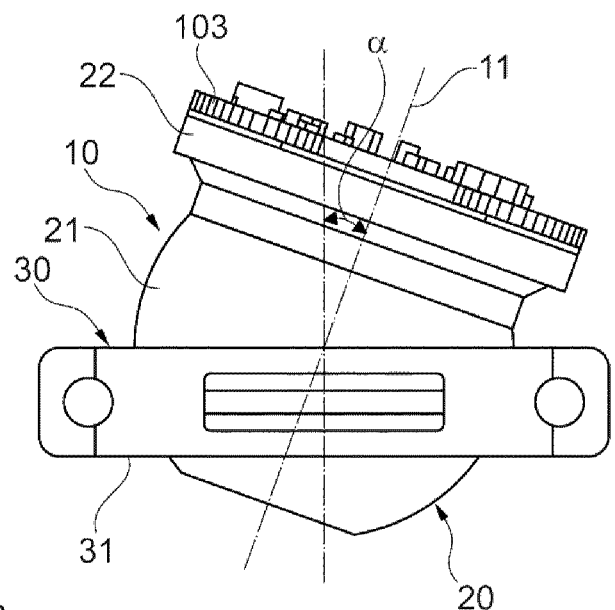
Figure 8C:
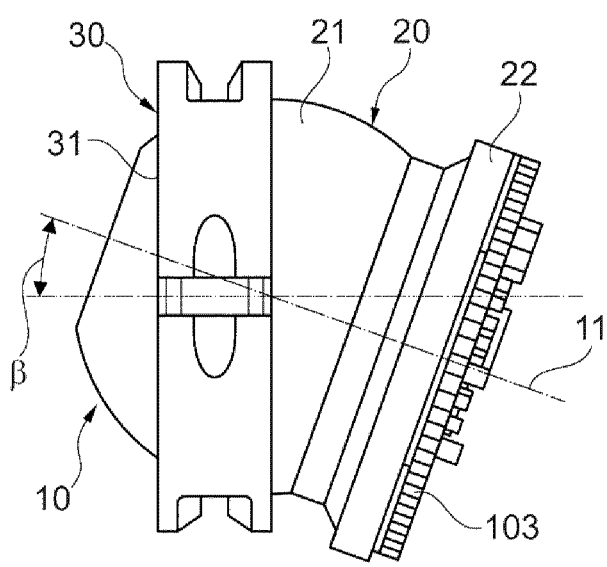
Figure 8C:
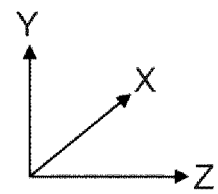

FIGS. 8A to 8C show various views of the camera sub-assembly 10 with an embodiment of a mounting structure 30 for adjusting and fixing various spatial orientations of the optical axis 11 of the camera sub-assembly 10. In the embodiment shown here, the mounting structure 30 is a retainer ring 31. FIG. 8A shows the situation that the spherical outer topology 21 of the housing part 20 is surrounded by the retainer ring 31. The optical axis 11 of the camera sub-assembly 10 is parallel to an axis of the Cartesian coordinate system (exemplary, the optical axis 11 is parallel to the Z-axis of the coordinate system). FIG. 8B shows the situation that the optical axis 11 of the camera sub-assembly 10 is tilted by an angle α in a plane of the Cartesian coordinate system (exemplary, the optical axis 11 is tilted in the X/Z-plane of the coordinate system). FIG. 8C shows the situation that the optical axis 11 of the camera sub-assembly 10 is tilted by an angle β in a plane of the Cartesian coordinate system (exemplary, the optical axis 11 is tilted in the Y/Z-plane of the coordinate system). The maximum tilt can be in a range of −α to +α or −β to +β, wherein the maximum value of α and β is 20°.

Figure 9A:
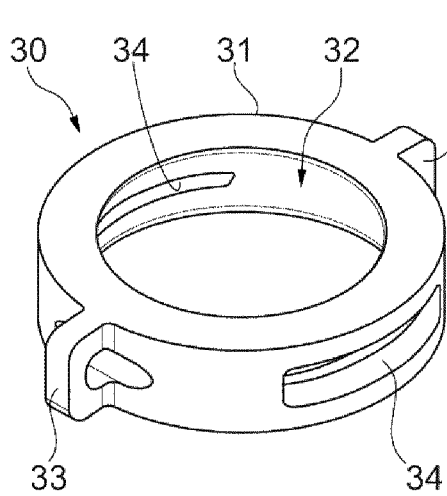
FIGS. 9A to 9C are various views of an embodiment of the mounting structure in the form of a retainer ring.
Figure 9B:
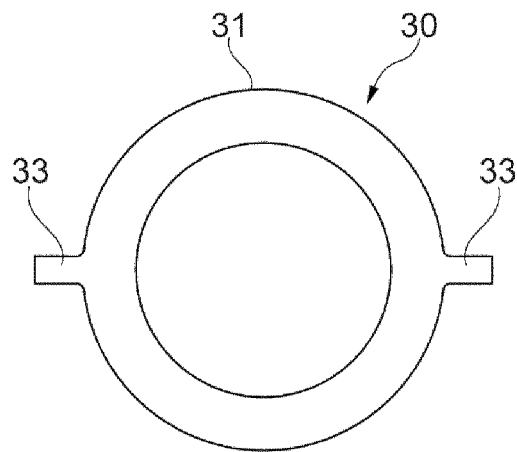
Figure 9C:
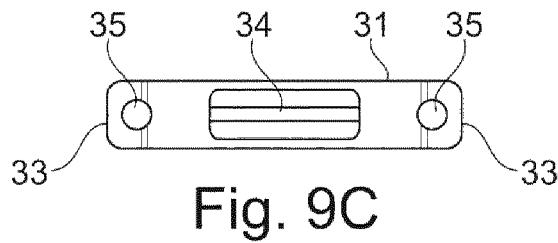

FIGS. 9A to 9C show various views of the retainer ring 31 which is used as the mounting structure 30 for the camera sub-assembly 10. The retainer ring 31 has formed a spheroidal inner topology 32. The spheroidal inner topology 32 of the retainer ring 31 matches the spherical outer contour 21 of the housing part 20 of the camera sub-assembly 10. The camera sub-assembly 10, when surrounded by the retainer ring 31 (see FIGS. 8A-8C), can be set at a desired angle. The retainer ring 31 has two lugs 33 with centering holes 35. The centering holes 35 of the retainer ring 31 provide an exact seating of the camera sub-assembly 10 on the housing base 9 (see FIG. 10). Another, optional function of the retainer ring 31 is to facilitate access of glue 39 (see FIG. 11E) to the interface between the retainer ring 31 and the spherical outer contour 21 of the housing part 20 of the camera sub-assembly 10. Therefore, the embodiment of the retainer ring 31 shown here has two windows 34, which are used to apply the glue 39.

Figure 10:
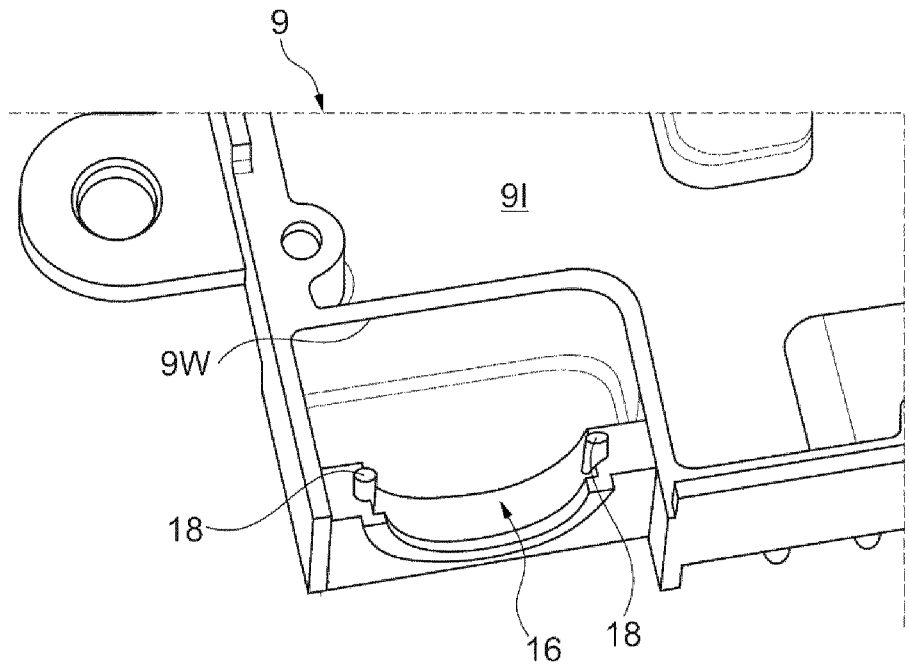
FIG. 10 is a partial sectional view of a portion of the housing base with the receptacle for the camera sub-assembly.

FIG. 10 is a partial sectional view of a portion of the housing base 9 with the receptacle 16 for the retainer ring 31 of the camera sub-assembly 10. A wall 9W of housing base 9 separates the receptacle 16 from the inner portion 91 of housing base 9. In addition, the receptacle 16 for the retainer ring 31 has two guiding pins 18 which help to locate the retainer ring 31 at the housing base 9. The guiding pins 18 reach into the centering holes 35 of the lugs 33 of the retainer ring 31 (see FIG. 9A-9C). Depending on the application, the guiding pins 18 can be located on the housing cover 8, instead.

Figure 11A:
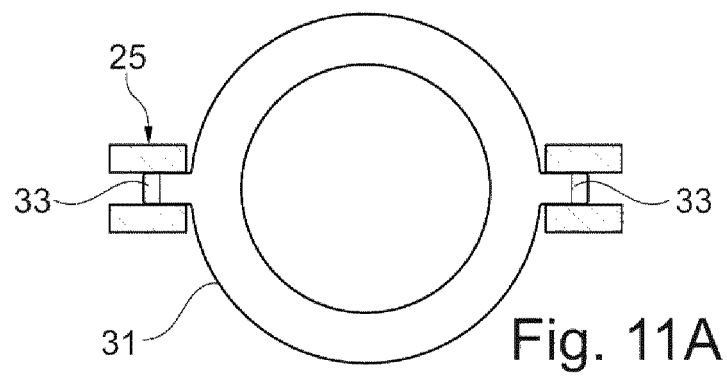
FIG. 11A to 11E show the stages of mounting and orienting the camera sub-assembly with respect to the retainer ring.
Figure 11B:
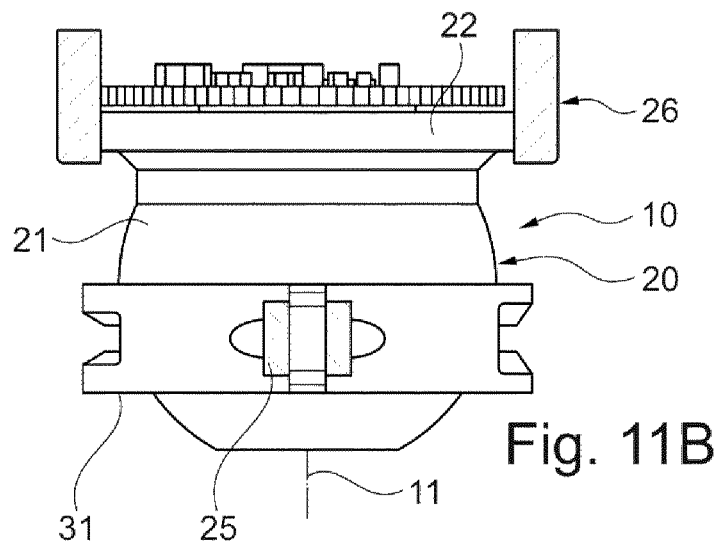
Figure 11C:
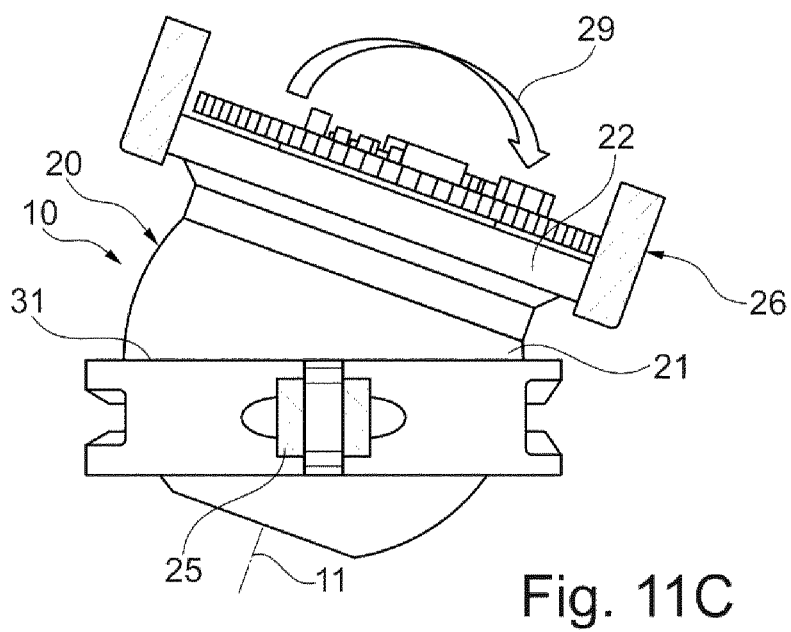
Figure 11D:
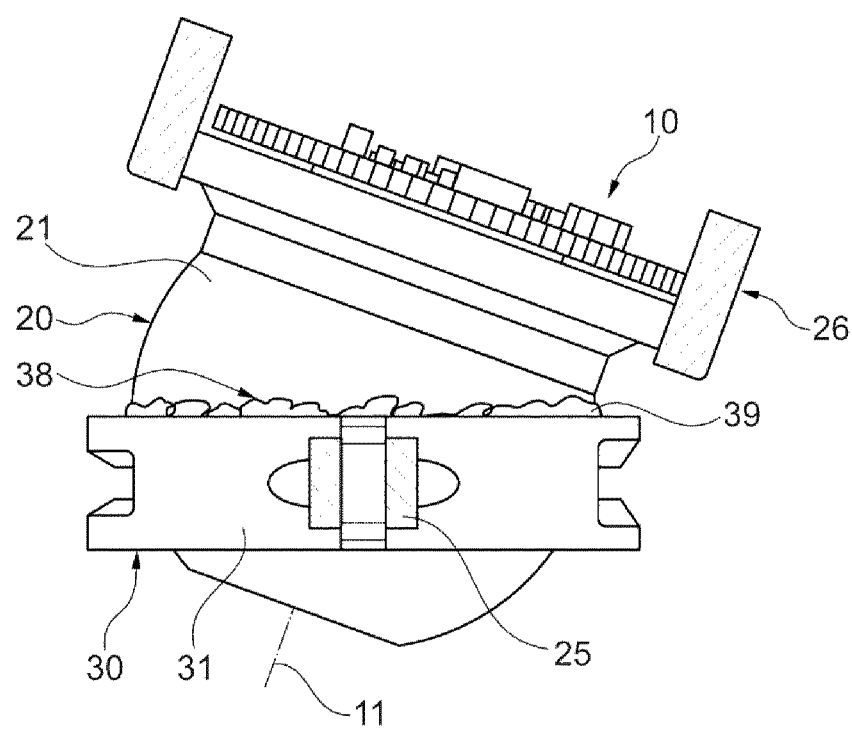
Figure 11E:
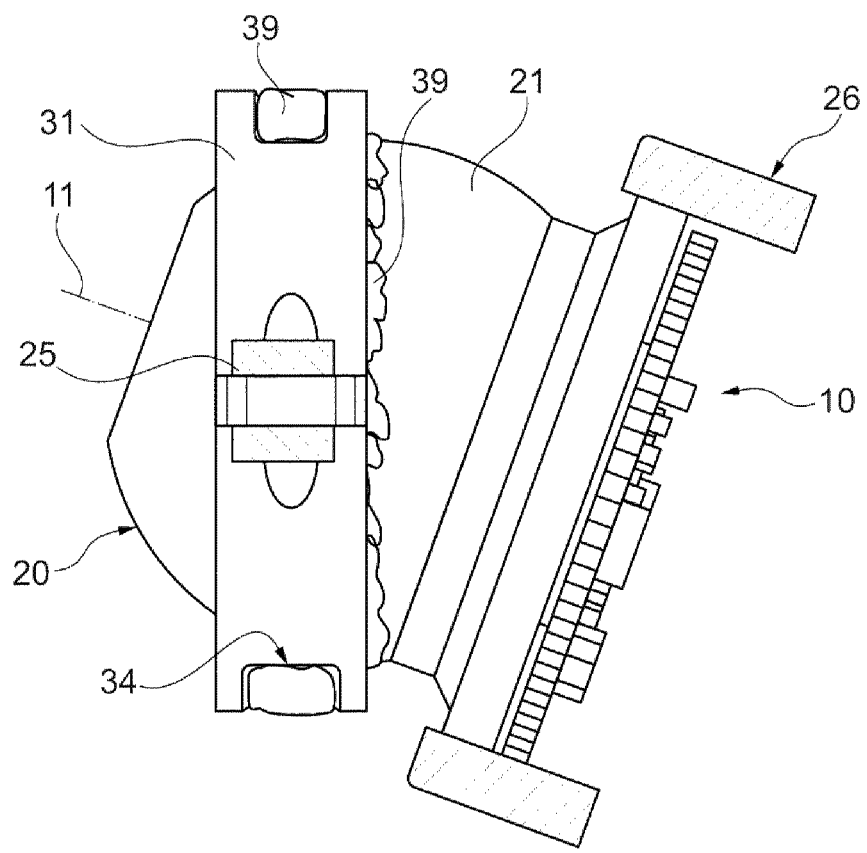

FIGS. 11A to 11E provide an insight of the stages of mounting and orienting the camera sub-assembly 10 with respect to the retainer ring 31. In FIG. 11A, the step of the mounting process is shown that the retainer ring 31 is fixed inside a jig 25. The jig 25 grasps the retainer ring 31 by the two lugs 33. In the next step as shown in FIG. 11B, the housing part 20 of the camera sub-assembly 10 is gripped by a gripping tool 26 at the gripping base 22 of the housing part 20 of the camera sub-assembly 10. The housing part 20 is positioned in a nominal position wherein the optical axis 11 is perpendicular to the retainer ring 31. In the step as shown in FIG. 11C, the housing part 20 of the camera sub-assembly 10 is rotated to the angle or angles imposed by the application. The gripping tool 26 is still in contact with the gripping base 22, and the jig 25 still holds the retainer ring 31. As a result of the rotation 29, the housing part 20 is positioned such that the optical axis 11 is angled with respect to the retainer ring 31. The cooperation of the spherical outer topology 21 of the housing part 20 of the camera sub-assembly 10 and the spheroidal inner topology 32 (see FIG. 9A) of the retainer ring 31 allow the free rotation 29. FIG. 11D shows the process step, wherein a glue 39 is applied at the boundary between the housing part 20 of the camera sub-assembly 10 and the retainer ring 31. The gripping tool 26 and the jig 25 are still active. Preferably, the glue 39 is applied as a seam 38 at the boundary between the retainer ring 31 and the housing part 20 of the camera sub-assembly 10. FIG. 11E shows an alternative or additional step. Here, the glue 39 is filled in at least one window 34 of the retainer ring 31. The gripping tool 26 and the jig 25 are still active. After glue 39 is cured, the gripping tool 26 and the jig 25 grippers are removed and the camera sub-assembly 10 is ready for mounting.

Figure 12:
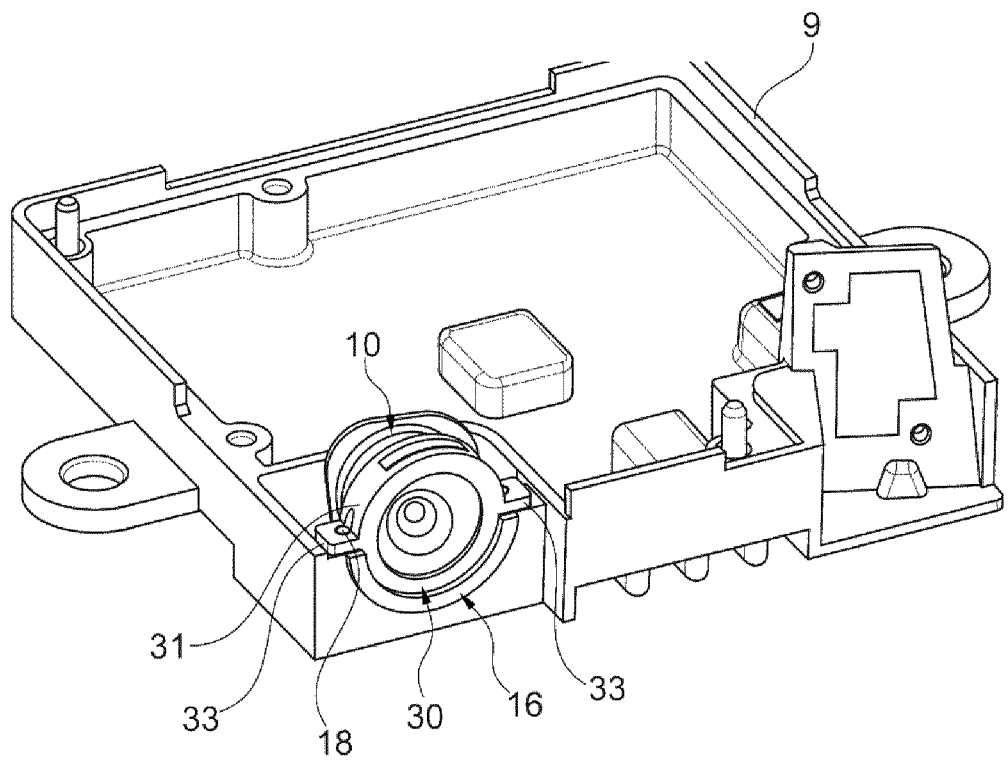
FIG. 12 is a perspective view of the housing base with the mounted camera sub-assembly.

A perspective view of the housing base 9 with the camera sub-assembly 10, wherein the optical axis 11 of the camera sub-assembly 10 is oriented and fixed, mounted in the receptacle 16 of the housing base 9, is shown in FIG. 12. Here, the mounting structure 30 is the retainer ring 31 which holds the camera sub-assembly 10 in an oriented and fixed state. A preferred, cost effective solution is to clamp the camera sub-assembly 10 with dedicated guiding pins 18 at the housing base 9. The guiding pins 18 reach into the centering holes 35 (see FIG. 9C) of the lugs 33 of the retainer ring 31.

Figure 13:
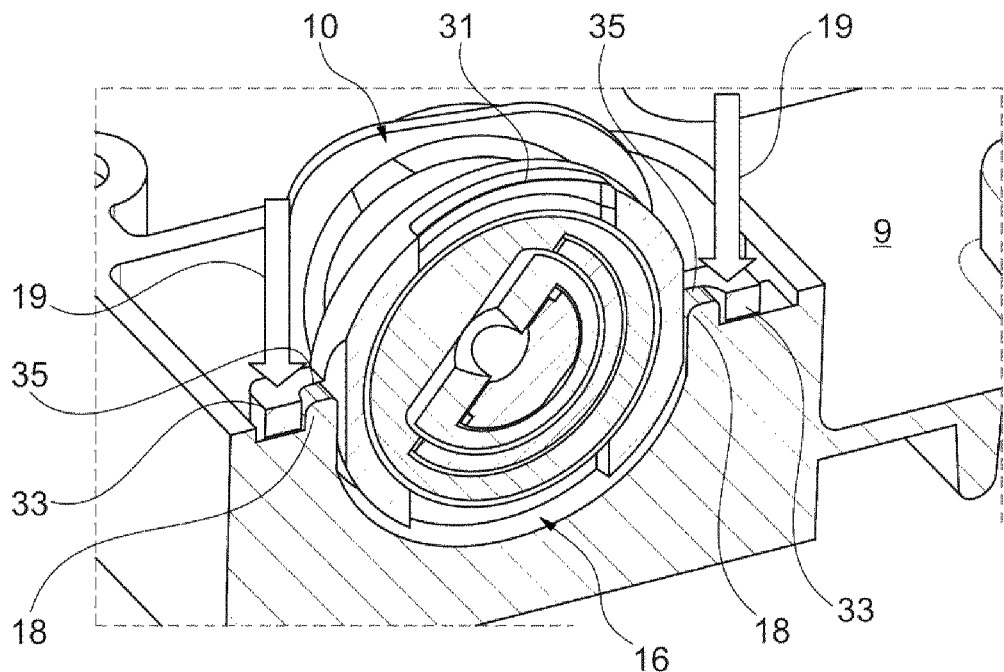
FIG. 13 is a sectional and enlarged view of the camera sub-assembly mounted to the housing base.

FIG. 13 is a sectional and enlarged view of the camera sub-assembly 10 mounted to the housing base 9. The dedicated guiding pins 18 of the receptacle 16 of the housing base 9 reach into the centering holes 35 of the lugs 33 when the retainer ring 31 is pressed with a force 19, acting on the lugs 33, towards the receptacle 16. The retainer ring 31 and consequently the camera sub-assembly 10 is firmly mounted to the housing base 9.

This is an economically fixation method, wherein the retainer ring 31 is fixed to the housing base 9, with no additional fixation part or operation. A guaranteed interference is needed between guiding pins 18 and centering holes 35, however one which does not lead to cracks in either part or need of high assembly forces. As interference would be variable with common part manufacturing precision, so will be the required assembly force, which may further mean a manufacturing challenge in making sure the final retainer ring 31 position was reached. It may as well be desirable to have no residual mechanical stress in the resulting assembly.

An alternative mounting method is "hot staking". Here, the guiding pins 18, likely together with entire housing base 9, are made of plastic. Then a centering, intermediate fit of guiding pins 18 (sometimes called stakes) on the centering holes 35 is possible. After the retainer ring 31 together with camera sub-assembly 10 has reached its final position on the housing base 9, a specific "hot staking head" is lowered on the tips of guiding pins 18 (centering pins) and warms them up over to the point of slight melting. The flowing material is pushed down so that a "rivet head" is created on top of lugs 33, thus locking the camera sub-assembly 10 and the housing base 9 together.

An alternative mounting method is "riveting". This mounting method is used once the centering pins 18, likely together with entire housing base 9, are made of metal, for example aluminium, low-carbon steel or copper, or other ductile materials. In the beginning a centering and intermediate fit of guiding pins 18 on centering holes 35 is carried out. After the retainer ring 31, together with the camera sub-assembly 10, have reached its final position on housing base 9, a specific press head (not shown) is lowered on the tips of centering pins 18. A specific stress with respect to the flow characteristic of a respective material is induced inside the tips of centering pins 18. The flowing material is pushed down so that a "rivet head" is created on top of lugs 33, thus locking the camera sub-assembly 10 and the housing base 9 together. The press may use a special die geometry to form the rivet head.

A further, alternative mounting method is a fixation by nuts, provided the tip of centering pins 18 are threaded. In the beginning, a centering and intermediate fit of pins 18 on centering holes 35 is carried out. After the retainer ring 31 together with camera sub-assembly 10 has reached its final position on housing base 9, a specific screwing machine (not shown) brings a nut to each threaded centering pin 18 and tightens it.

Figure 14:
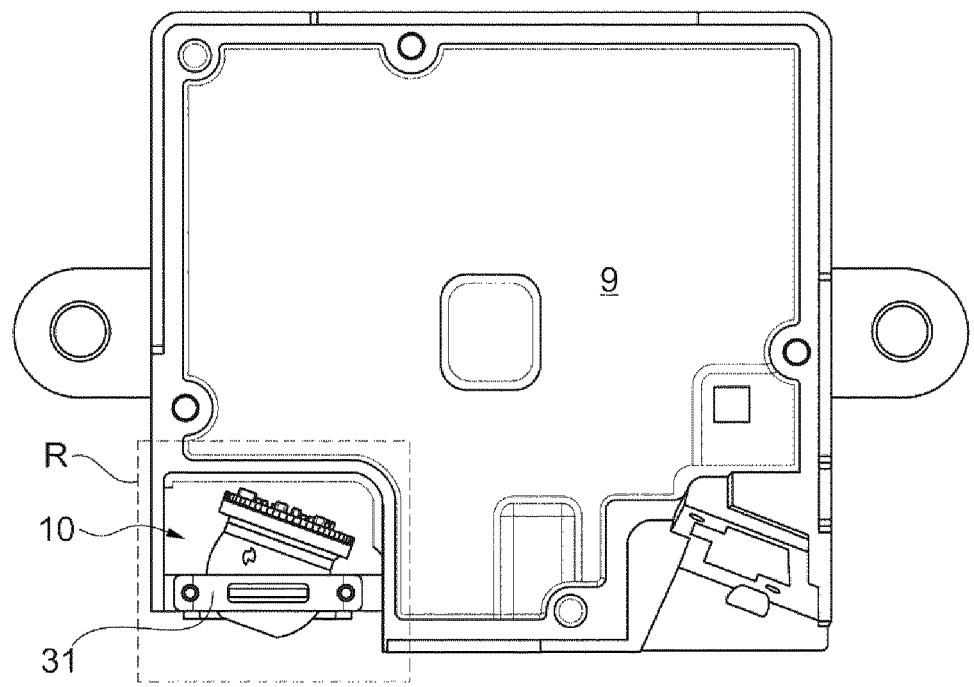
FIG. 14 is a top view of the housing base wherein the oriented camera sub-assembly is mounted to the housing base with the retainer ring.
Figure 15:
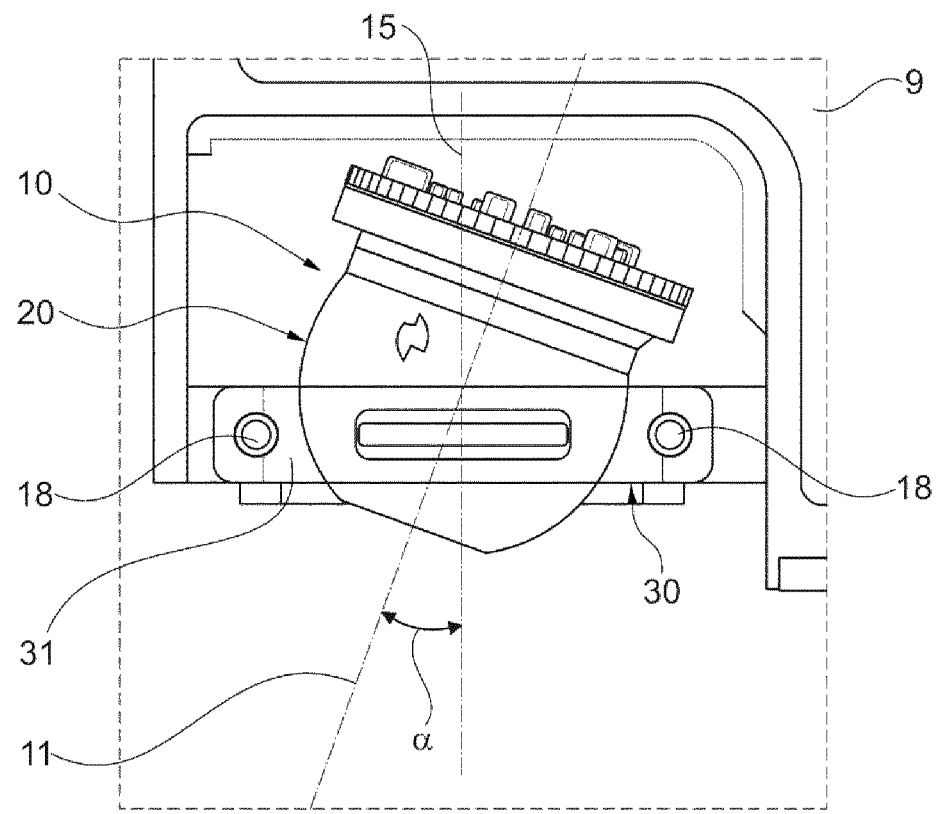
FIG. 15 is an enlarged view of the area marked with the rectangle R in FIG. 14.

FIG. 14 is a top view of the housing base 9, wherein the oriented camera sub-assembly 10 is mounted to the housing base 9 with the retainer ring 31. FIG. 15 is an enlarged view of the area marked with the rectangle R in FIG. 14. The retainer ring 31 with the camera sub-assembly 10 is attached to the housing base 9 with the guiding pins 18. The fixed orientation of the optical axis 11 of the camera sub-assembly 10 depends on the particular application of the vision module 1. The angle α of the optical axis 11 of camera sub-assembly 10 can be selected between −20° and +20° to the nominal position 15.

Figure 16:
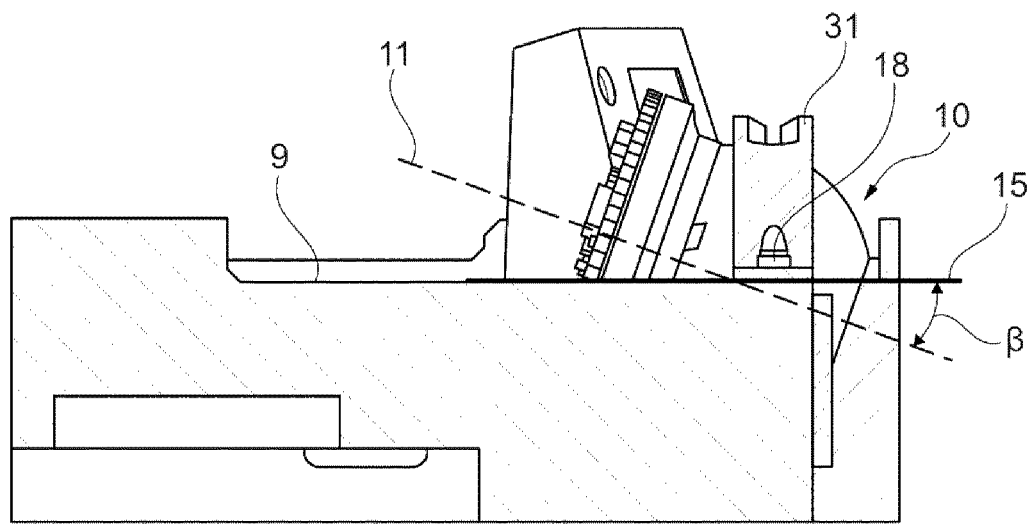
FIG. 16 is an enlarged and partial side view of the housing base with the mounted camera sub-assembly.

FIG. 16 is an enlarged and partial side view of the housing base 9 with the mounted camera sub-assembly 10. The retainer ring 31 with the camera sub-assembly 10 is attached to the housing base 9 with the guiding pins 18. The fixed orientation of the optical axis 11 of the camera sub-assembly 10 depends on the particular application of the vision module 1. The angle R of the optical axis 11 of camera sub-assembly 10 can be selected between −20° and +20° to the nominal position 15. Here, the optical axis 11 is pointing down.

It is noted that the glue 39 required for fixing the set orientation of the optical axis 11 is not shown in FIGS. 14, 15 and 16.

Figure 17:
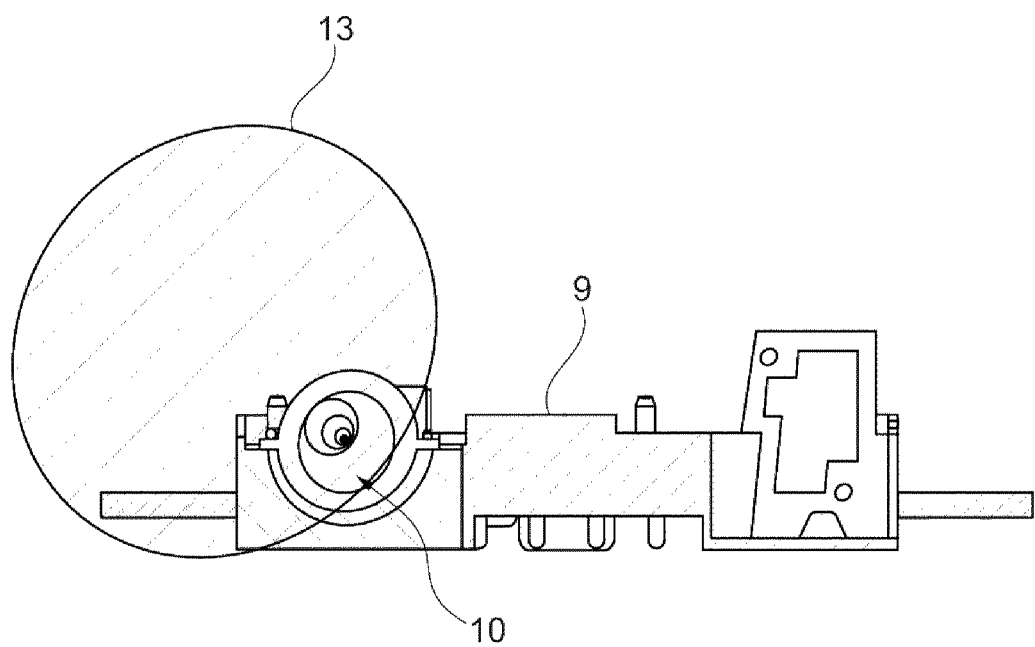
FIG. 17 is a front view of the housing base with the mounted camera sub-assembly showing an example of extreme adjustment of the camera sub-assembly about two axes.

FIG. 17 is a front view of the housing base 9 with the mounted camera sub-assembly 10 showing an example of extreme adjustment of the camera sub assembly 10. As shown here, an aperture opening 13 of the camera sub assembly 10 is pointing to the upper left. This is only one of several adjustments of the camera sub-assembly 10 and should not be regarded as a limiting factor of the invention.

FIG. 18 is a perspective view of the outer housing 7 of the vison module 1 for driver monitoring. The outer housing 7 is composed of the housing base 9 and a housing cover 8. The vison module 1 for driver monitoring holds the camera sub-assembly 10 and an infrared module 12. The outer housing 7 partly encloses the camera sub-assembly 10, and with the housing cover 8 and the housing base 9 the camera sub-assembly 10 is held in position in the vison module 1 for driver monitoring. The housing base 9 has at least one mounting ear 6 for fixing the vison module 1 for driver monitoring in the vehicle 2 (see FIG. 1).

FIGS. 19A and 19B show various views of a further embodiment of the retainer ring 31. The retainer ring 31 has the same general topology as the embodiment shown in FIGS. 9A to 9C. The retainer ring 31, shown here, has ability to retain camera sub-assembly 10 before glue 39 is applied. The spheroidal inner topology 32 of the retainer ring 31 is centered in the middle plane 36 of the retainer ring 31. As mentioned in the description with regard to FIG. 7A to 7C, the housing part 20 of the camera sub-assembly 10 has a spherical topology 21 to match the spheroidal inner topology 32 (counter-topology) on the retainer ring 31.

Figure 20B:
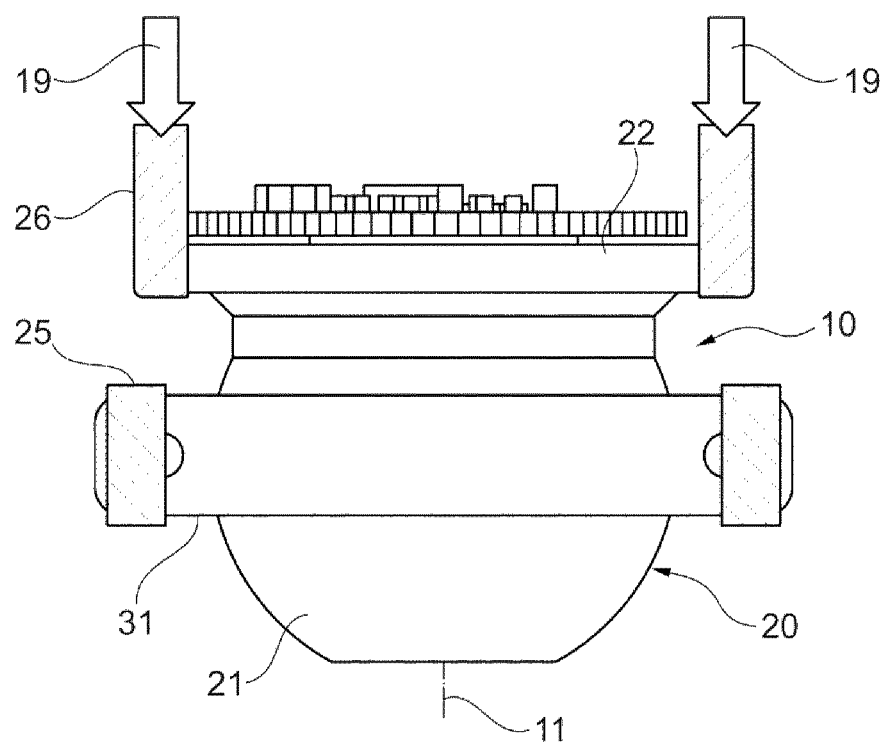

FIGS. 20A to 20B show the stages of mounting the camera sub-assembly 10 and the retainer ring 31 as shown in the embodiment of FIGS. 19A and 19B. The housing part 20 of the camera sub-assembly 10 has the gripping base 22 which is in contact with the gripping tool 26, which is used for gripping during the assembly of the camera sub-assembly 10 with the retainer ring 31. The jig 25 grasps the retainer ring 31 by the two lugs 33. The housing part 20 of the camera sub-assembly 10 is inserted into the retainer ring 31.

Additionally, as shown in FIG. 20B, an additional insertion force 19 is applied, so that housing part 20 of the camera sub-assembly 10 is pushed into the retainer ring 31. The insertion force 19 is necessary in order that the housing part 20 of the camera sub-assembly 10 gets over the initial interference with retainer ring 31. The insertion force 19 is parallel to the optical axis 11. After the retainer ring 31 has reached the final position, the angular adjustment can be carried out. The gripping tool 26 is in contact with the gripping base 22 and applies the required adjustment torques to change the orientation of the optical axis 11. The gripping tool 26 is in contact with the gripping base 22 of the housing part 20 of the camera sub-assembly 10 until the glue (not shown here) is cured.

Figure 21:
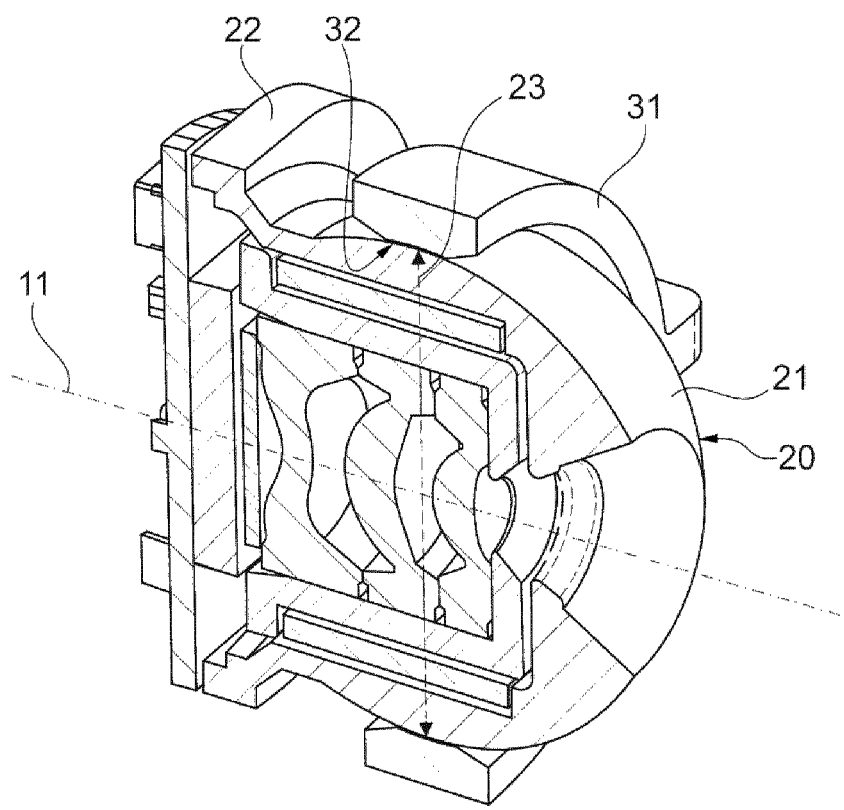
FIG. 21 is an enlarged sectional view of the camera sub-assembly in the nominal position mounted according to the steps shown in FIG. 20A-20B.

FIG. 21 is an enlarged sectional view of the camera sub-assembly 10 in the nominal position 23, wherein the camera sub-assembly 10 is held by the retainer ring 31. The retainer ring 31 is mounted according to the steps shown in FIG. 20A to 20B. The spherical outer topology 21 of the housing part 20 of the camera sub-assembly is in contact with the spheroidal inner topology 32 of the retainer ring 31. The retainer ring 31 matches the spherical outer contour 21 of the housing part 20 of the camera sub-assembly 10 at a position 23 of a maximal diameter of the housing part 20 of the camera sub-assembly 10. The diameter is perpendicular to the optical axis 11.

Figure 22:
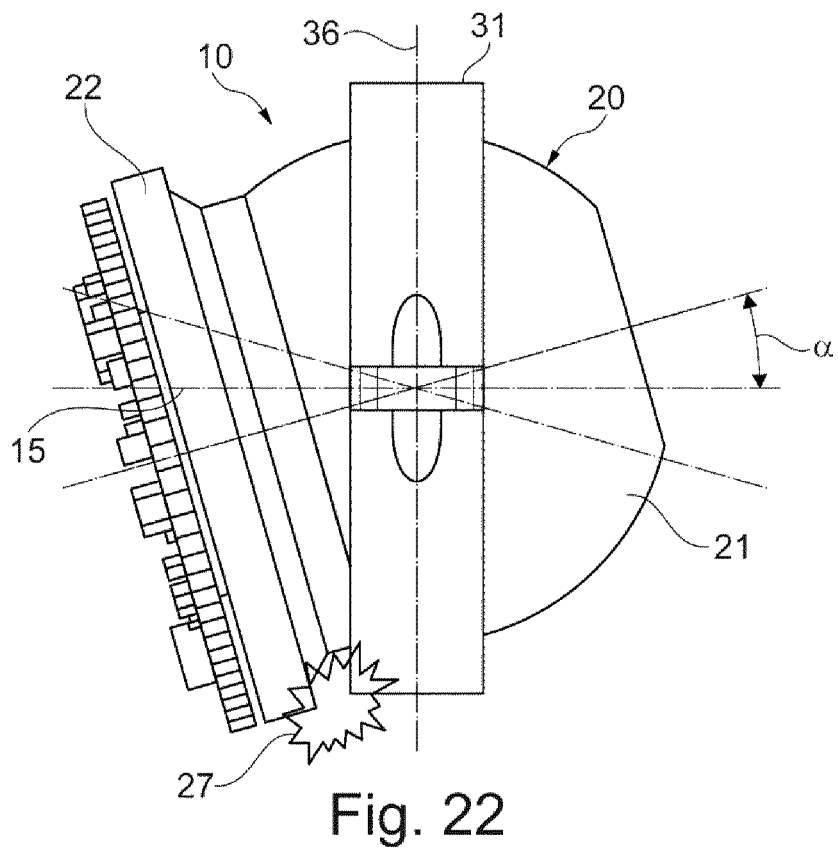
FIG. 22 is a side view of the camera sub-assembly, showing the possible orientations.

FIG. 22 is a side view of the camera sub-assembly 10, showing the possible orientations. The retainer ring 31, as positioned in the embodiment shown in FIG. 21, limits the variety of the angle α around the nominal position of 15°. The marking 27 in FIG. 22 shows the limitation of the rotational movement of the housing part 20 of the camera sub-assembly 10 in the retainer ring 31. The rotational movement is limited by the gripping base 22 of the housing part 20.

Figure 23A:
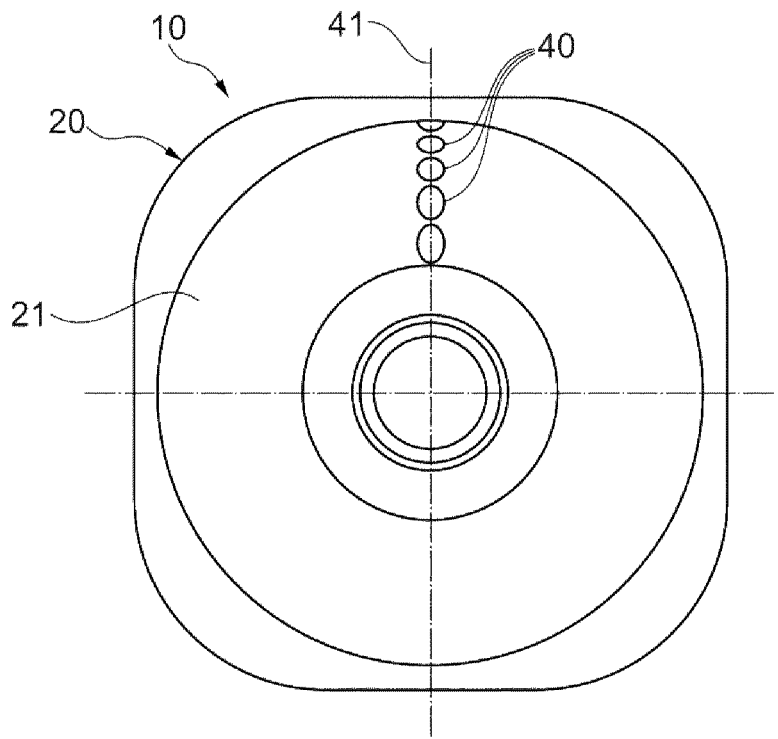
FIG. 23A-23B are various views of a further embodiment of the camera sub-assembly.
Figure 23B:
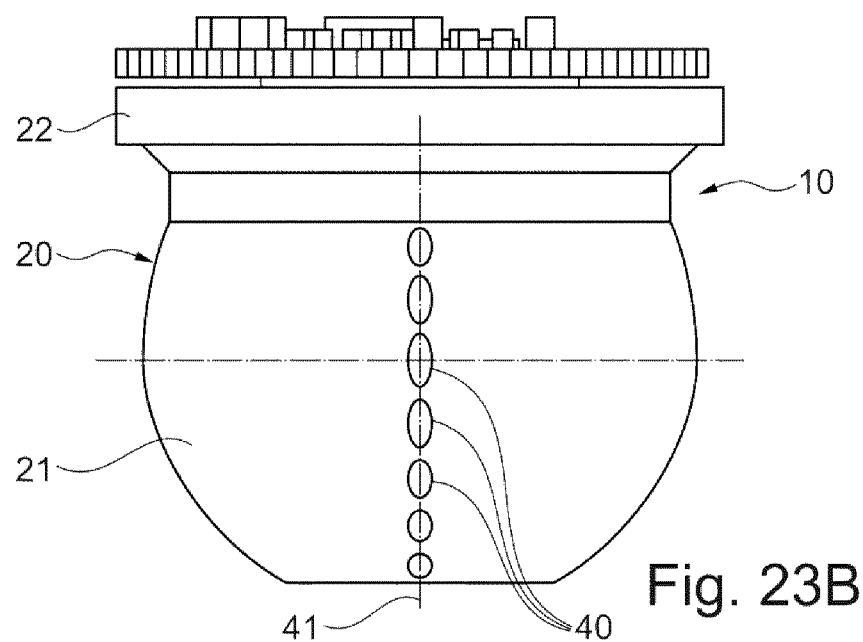

FIGS. 23A and 23B show a further embodiment of the camera sub-assembly 10. The housing part 20 of the camera sub-assembly 10 has a spherical outer topology 21. The housing part 20 with the spherical outer topology 21 hosts a pattern of indexing holes 40 (recesses), which are arranged along one generatrix 41. The number of indexing holes 40 shall be chosen according to the desired increment of the adjustment angle.

Figure 24:
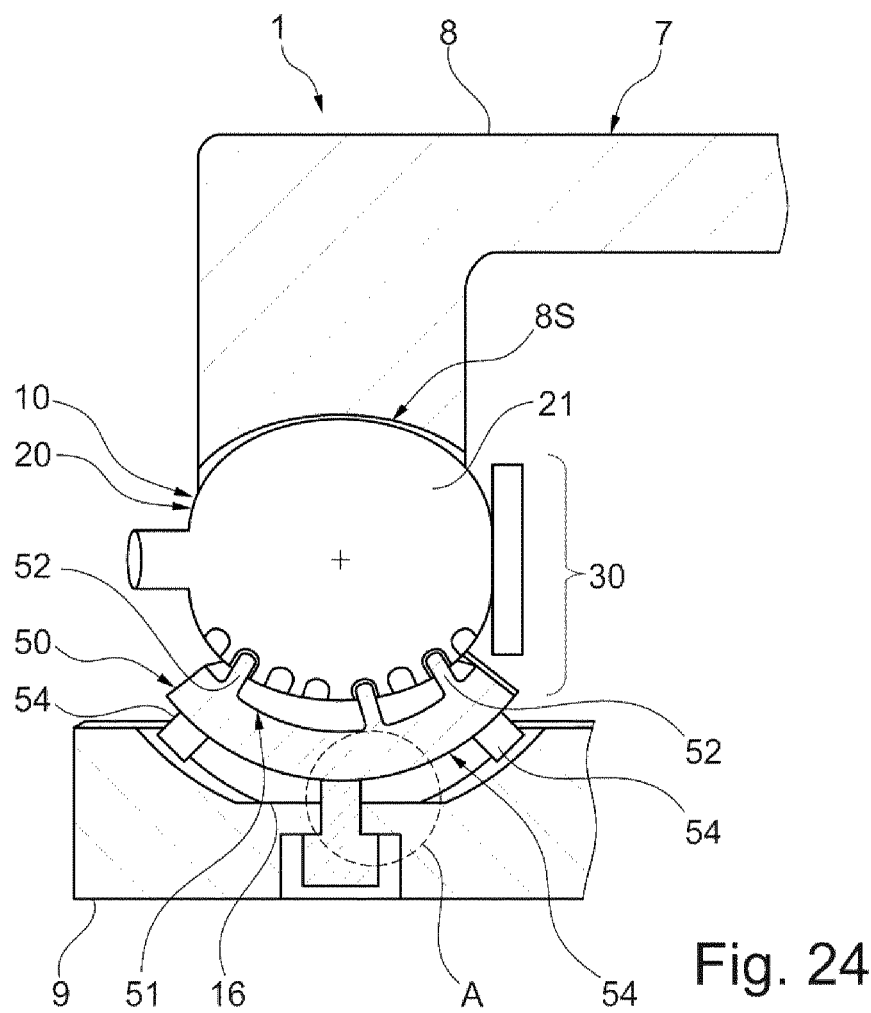
FIG. 24 is a schematic view of embodiment of a mounting structure for a camera sub-assembly in an outer housing of the vision module.

FIG. 24 is a schematic view of embodiment of a mounting structure 30 for a camera sub-assembly 10 in an outer housing 7 of the vison module 1 for driver monitoring. The mounting structure 30 according to the embodiment shown here is defined by a spherical topology 8S of the housing cover 8 and an indexing pivot 50 sitting in the receptacle 16 of the housing base 9 of the outer housing 7. The housing cover 8 and the housing base 9 are made of aluminium. The spherical topology 8S of the housing cover 8 is in form fitting contact with the spherical outer topology 21 of the housing part 20 of the camera sub-assembly 10. The generatrix 41 of the housing part 20 with the indexing holes 40 is in contact with indexing teeth 52 of the indexing pivot 50. The indexing teeth 52 are arranged on a spherical sitting area 51. A bottom side 53 of the indexing pivot 50 has indexing fins 54. The indexing pivot 50 is suitable to be manufactured from a thermoplastic polymer (for example Polybutylene-terephthalate (PBT), Acrylonitrile butadiene styrene (ABS), Polycarbonate (PC), etc.).

Figure 25:
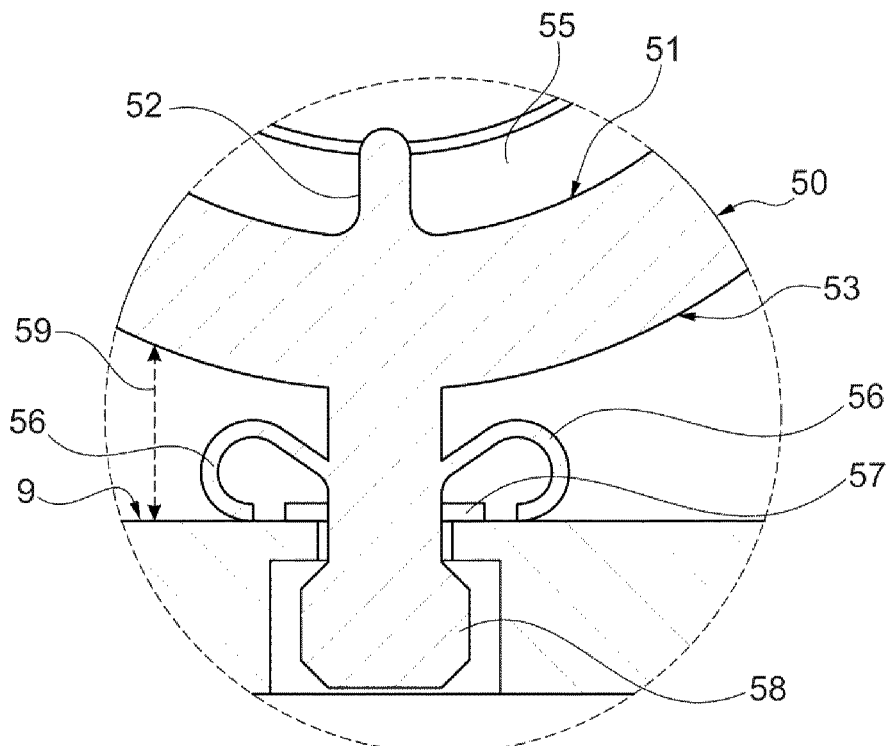
FIG. 25 is an enlarged view of the area marked with A of FIG. 24.

FIG. 25 is an enlarged view of the area marked with A in FIG. 24. The indexing pivot 50 has the spherical sitting area 51 with a groove 55 inside it. The groove 55 is as deep as needed in order to allow flexibility to indexing teeth 52. According to the embodiment as shown in FIG. 24, three indexing teeth 52 are located inside the groove 55 and are slightly projected outside. The indexing pivot 50 has a pivot shaft 58 which is sitting in the housing base 9. An air gap 59 is between the bottom side 53 and the housing base 9. Spring leaves 56 and stopper 57 are in the air gap 59 and ensure the stable positioning and movement of the indexing pivot 50.

Figure 26:
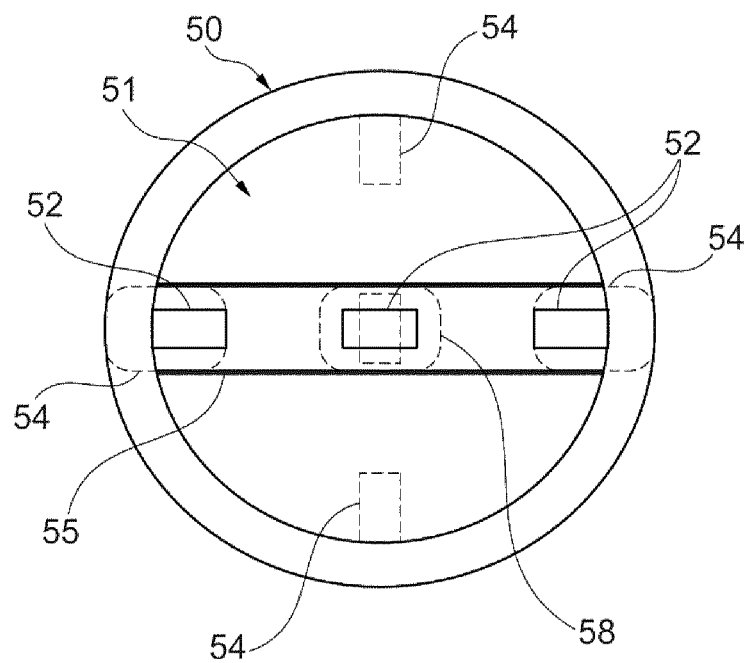
FIG. 26 is a schematic top view of the indexing pivot of the mounting structure of FIG. 24.

FIG. 26 is a schematic top view of the indexing pivot 50 of the mounting structure 30 as shown in FIG. 24. The indexing fins 54 (indicated with dashed lines) are formed on the bottom side 53 (see FIG. 24 or 25) of the indexing pivot 50. In the embodiment shown here, four indexing fins 54 are provided. The groove 55 of the spherical sitting area 51 has formed the indexing teeth 52. In the embodiment shown here, three indexing teeth 52 are provided. The pivot shaft 58 of the indexing pivot 50 is arranged below the central indexing teeth 52.

Figure 27:
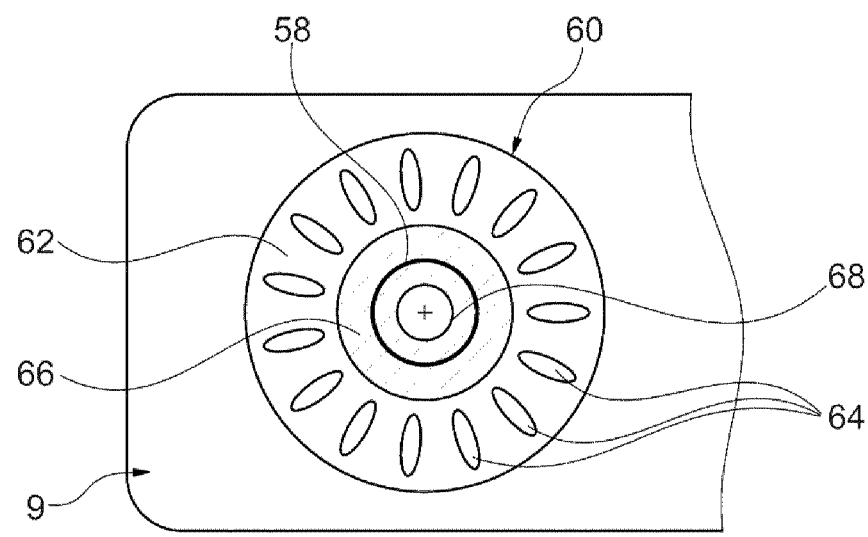
FIG. 27 is a schematic top view of a rotational area of the mounting structure of FIG. 24.

FIG. 27 is a schematic top view of a rotational area of the mounting structure 30 of FIG. 24. The housing base 9 has a specially formed receptacle 16. Additionally, the receptacle 16 holds an indexing and sitting recess 60. Depending on the application, the indexing and sitting recess 60 is positioned on the receptacle 16 of the housing base 9. The indexing and sitting recess 60 features comprise a rotational area 62. The rotational area 62 has formed a rotational pattern of grooves 64. A central flat area 66 of the indexing and sitting recess 60 is used as a counter topology of the indexing pivot 50 (see FIG. 25). The central flat area 66 has a formed hole 68 for fixation of the pivot shaft 58. The number of grooves 68 shall be chosen in accordance to the desired increment of adjustment angle. The indexing and sitting recess 60 is suitable for manufacturing from aluminium. It is obvious for any person skilled in the art that other materials, like other metals or plastic materials, can be used instead of aluminium.

Figure 28:
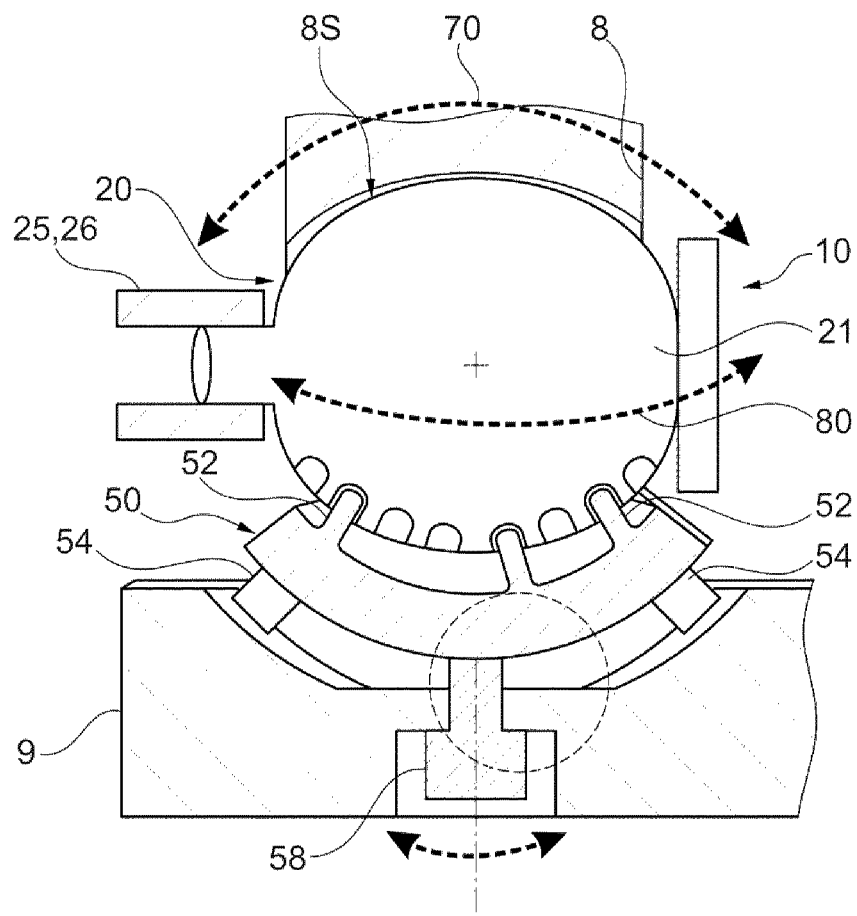
FIG. 28 is a schematic representation of the angular adjustment camera sub-assembly with the mounting structure of FIG. 24.

FIG. 28 is a schematic representation of the angular adjustment of the camera sub-assembly 10 with the mounting structure 30 as shown in FIG. 24. A preferred, cost effective solution is to clamp the housing part 20 of the camera sub-assembly 10 with its spherical outer topology 21 in cooperation with the spherical topology 8S of the housing cover 8. Prior art screws (not shown) can be used to secure the housing cover 8 to the housing base 9. The indexing pivot 50 and the camera sub-assembly 10 are sandwiched between the housing cover 8 to the housing base 9. For tolerance compensation, on assembly direction the spring leaves 56 are provided in the air gap 59 (see FIG. 25). The tolerance to be compensated is estimated to be less than 1 mm. The spring leaves 56 will be stiff enough so that the camera sub-assembly 10 will not rattle.

The assembly of the camera sub-assembly 10 to the outer housing 7 (housing cover 8 and housing base 9) comprises several steps. First, the camera sub-assembly 10 is gripped by the assembly jig 25. Next, the indexing pivot 50 is lowered toward the housing base 9 and the pivot shaft 58 is pushed through the hole 68 of the central flat area 66 (see FIG. 27). Thereby, the pivot shaft 58 is fixed to the housing base 9. As pivot shaft 58 shaft is pushed in, the pivot shaft 58 becomes captive while the spring leaves 56 become tense (see FIG. 25). Then the camera sub-assembly 10 is lowered onto the indexing pivot 50, in a way so that the indexing teeth 52 of the indexing pivot 50 reach the respective indexing holes 40 inside the housing part 20 of the camera sub-assembly 10. As this is accomplished, the spherical sitting area 51 of indexing pivot 50 gets in contact with the spherical outer topology 21 of housing part 20 of the camera sub-assembly 10 (except for the groove 55). Next, the housing cover 8 is lowered onto the housing base 9 and becomes fully in contact with the housing base 9. The spring leaves 58 of the indexing pivot 50 accommodate the overlap, and the spherical topology 8S of the housing cover 8 gets into contact with the spherical outer topology 21 of the housing part 20 of the camera sub-assembly 10. The two adjustment angles are adjusted to the functional position of the assembly, as required by the parameters of vehicle 2. The adjustment is carried out with the help of gripping tool 26. The solutions for gripping may vary and the solution shown in FIG. 28 should not be regarded as a limitation of the invention.

When the housing part 20 of the camera sub-assembly 10 is rotated in a first direction 70, the indexing teeth 52 on the indexing pivot 50 will get into contact with another set of indexing holes 40 in the spherical outer topology 21 of the housing part 20 of the camera sub-assembly 10. Due to the indexing, the angular adjustment shall be done in steps equal to the angular ratio of hole pattern. Only the housing part 20 of the camera sub-assembly 10 is rotated.

When the housing part 20 of the camera sub-assembly 10 is in a second direction 80, the indexing fins 54 on the indexing pivot 50 will get into contact with the set of indexing grooves 64 of the indexing and sitting recess 60 (see FIG. 27). The housing part 20 of the camera sub-assembly 10 and the indexing pivot 50 rotate together. Due to the indexing, the angular adjustment shall be done in steps equal to the angular ratio of groove pattern of the indexing and sitting recess 60. The rotation moment is transferred from the griping tool 26 to the housing part 20 of the camera sub-assembly 10 to the indexing teeth 52 of the indexing pivot 50 and to the indexing fins 54 of the indexing pivot 50.

The set of the angular adjustment of the housing part 20 of the camera sub-assembly 10 can be carried out optionally in the manufacturer's plant. The elasticity of the indexing teeth 52 and the indexing fins 54 ensure an easy position change.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

The invention claimed is:

1. A vision module for monitoring a driver of a vehicle, comprising:
    a camera sub-assembly positioned inside an outer housing, wherein its optical axis is pointing to an outside of the outer housing, wherein the outer housing is defined by a housing cover and a housing base,
    a housing part of the camera sub-assembly having a spherical outer topology;

a mounting structure in cooperation with the spherical outer topology of the camera sub-assembly (10) for setting a spatial angular orientation of the camera sub-assembly (10); and a receptacle of the housing base for receiving the mounting structure, wherein the housing cover, mounted to the housing base, holds the mounting structure in a defined position in the outer housing, wherein the mounting structure comprises a retainer ring with a spheroidal inner topology, which matches the spherical outer topology of the housing part of the camera sub-assembly, and wherein the spherical inner topology of the retainer ring is centered in a middle plane of the retainer ring, and the spherical inner topology of the retainer ring matches the spherical outer topology of the housing part of the camera sub-assembly at a position of a maximal diameter of the housing part of the camera sub-assembly, which maximal diameter is perpendicular to the optical axis.

2. The vision module as claimed in claim 1, wherein a spatial orientation of the optical axis is fixed by a glue provided such that a relative movement of the retainer ring and the spherical outer topology of the housing part of the camera sub-assembly is blocked.

3. The vision module as claimed in claim 2, wherein the glue is applied as a seam at a boundary between the retainer ring and the housing part of the camera sub-assembly or in at least one window of the retainer ring.

4. The vision module as claimed in claim 1, wherein the retainer ring is centered with the spherical inner topology in a middle plane of the retainer ring, and the retainer ring matches the spherical outer topology of the housing part of the camera sub-assembly, and after spatial orientation of the optical axis, the retainer ring is in tight fit contact with the housing part of the camera sub-assembly.

5. The vision module as claimed in claim 4, wherein the housing part of the camera sub-assembly and the retainer ring are both formed from a same material.

6. A vision module for monitoring a driver of a vehicle, comprising:

A camera sub-assembly positioned inside an outer housing, wherein its optical axis is pointing to an outside of the outer housing, wherein the outer housing is defined by a housing cover and a housing base, a housing part of the camera sub-assembly having a spherical outer topology;

a mounting structure in cooperation with the spherical outer topology of the camera sub-assembly (10) for setting a spatial angular orientation of the camera sub-assembly (10); and a receptacle of the housing base for receiving the mounting structure, wherein the housing cover, mounted to the housing base, holds the mounting structure in a defined position in the outer housing, wherein the mounting structure is defined by an indexing pivot, positioned in the receptacle of the housing base, wherein a spherical topology is part of the housing cover which is in form-fitting contact with the spherical outer topology of the housing part of the camera sub-assembly, to allow a rotating movement around a pivot shaft sitting in the housing base and allow a movement along the indexing pivot.

7. The vision module as claimed in claim 6, wherein the indexing pivot has a plurality of indexing teeth which are in contact with a set of indexing holes in the spherical outer topology of the housing part of the camera sub-assembly.

8. The vision module as claimed in claim 6, wherein the indexing pivot has indexing fins, wherein the indexing fins interact with grooves of an indexing and sitting recess, which is positioned on the receptacle of the housing base.

9. A method for manufacturing a vision module for monitoring a driver of a vehicle, wherein the vision module comprises at least a camera sub-assembly positioned inside an outer housing, wherein its optical axis is pointing to an outside of the outer housing, the outer housing is defined by a housing cover and a housing base, and a housing part of the camera sub-assembly has a spherical outer topology;

comprising the steps of:

providing a mounting structure cooperating with the spherical outer topology of the housing part of the camera sub-assembly;

positioning the camera sub-assembly with the mounting structure in a receptacle of the housing base; and mounting the housing cover to the housing base and thereby positioning the housing part of the camera sub-assembly, so that a spatial orientation of an optical axis of the camera sub-assembly is fixed by the assembled housing cover in a previously oriented direction, or a spatial orientation of the optical axis of the camera sub-assembly is adjustable by a rotational movement of the housing part of the camera sub-assembly in the assembled outer housing, wherein the mounting structure is defined by an indexing pivot sitting in the receptacle of the housing base and an orientation of the optical axis of the camera sub-assembly is adjusted by a gripping tool after the housing cover is mounted to the housing base so that a spherical topology of the housing cover is in form fitting contact with the spherical outer topology of the housing part of the camera sub-assembly.

10. The method as claimed in claim 9, wherein the mounting structure is a retainer ring which surrounds a spherical outer topology of the housing part of the camera sub-assembly and an orientation of the optical axis of the camera sub-assembly is adjusted by a gripping tool prior to positioning the retainer ring on the receptacle of the housing base.

11. The method as claimed in claim 10, wherein the adjusted orientation of the optical axis of the camera sub-assembly is maintained by a glue applied as a seam between the retainer ring and the spherical outer topology of the housing part or by a glue filled in at least one window of the retainer ring or by a tight fit contact the retainer ring with the housing part of the camera sub-assembly after a spatial orientation of the optical axis.

12. The method as claimed in claim 9, wherein an orientation of the optical axis of the camera sub-assembly in a first rotating direction is maintained by indexing teeth of the indexing pivot which get into contact with another set of indexing holes in the spherical outer topology of the housing part of the camera sub-assembly, and an orientation of the optical axis of the camera sub-assembly in a second rotating direction is maintained by indexing fins of the indexing pivot which get into contact with a set of indexing grooves of an indexing and sitting recess on the receptacle.

\* \* \* \* \*